United States Patent
Van Der Velde et al.

(10) Patent No.: US 11,695,522 B2
(45) Date of Patent: *Jul. 4, 2023

(54) METHOD AND APPARATUS FOR IMPLEMENTING DUAL CONNECTIVITY

(71) Applicant: Samsung Electronics Co., Ltd., Suwon-si (KR)

(72) Inventors: Himke Van Der Velde, Zwolle (NL); Soenghun Kim, Suwon-si (KR); Gert-Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,745

(22) Filed: Nov. 20, 2020

(65) Prior Publication Data

US 2021/0075567 A1 Mar. 11, 2021

Related U.S. Application Data

(63) Continuation of application No. 16/357,121, filed on Mar. 18, 2019, now Pat. No. 10,848,280, which is a (Continued)

(30) Foreign Application Priority Data

Jan. 31, 2014 (GB) ..................... 1401737

(51) Int. Cl.
*H04L 5/00* (2006.01)
*H04W 76/40* (2018.01)
(Continued)

(52) U.S. Cl.
CPC ........... *H04L 5/0032* (2013.01); *H04W 76/15* (2018.02); *H04W 76/40* (2018.02); *H04L 5/001* (2013.01);
(Continued)

(58) Field of Classification Search
None
See application file for complete search history.

(56) References Cited

U.S. PATENT DOCUMENTS 8,509,183 B2 8/2013 Kim et al.
10,237,027 B2 * 3/2019 Der Velde ............. H04L 5/0032
(Continued)

FOREIGN PATENT DOCUMENTS

CN 102143521 A 8/2011
CN 102378299 A 3/2012
(Continued)

OTHER PUBLICATIONS

Office Action dated Dec. 28, 2020 in connection with Korean Application No. 10-2016-7014655, 10 pages.
(Continued)

*Primary Examiner* — Kouroush Mohebbi

(57) ABSTRACT

A wireless access node (e.g. a master eNB (MeNB)) is described for a wireless communication system that comprises a first wireless access network and a second wireless access network supporting a dual connectivity terminal device arranged to communicate with both the wireless access node (MeNB) on the first wireless access network and a second wireless access node (e.g. a secondary eNB (SeNB)) on the second wireless access network is provided. The wireless access node comprises a communication unit and a controller. The controller is operably coupled to the communication unit and configured to control the communication unit to transmit a first message including configuration information for a secondary cell group (SCG) to perform a certain action, to the other base station, and to receive a second message in response to the first message from the other base station, and to control the communication to transmit a third message based on the second message to the terminal, wherein the configuration information includes multimedia broadcast multicast service (MBMS) interest information.

32 Claims, 12 Drawing Sheets

Related U.S. Application Data continuation of application No. 14/611,016, filed on Jan. 30, 2015, now Pat. No. 10,237,027.

(51) Int. Cl.
| | | |
|---|---|---|
| *H04W 76/15* | (2018.01) | |
| *H04W 88/06* | (2009.01) | |
| *H04W 92/20* | (2009.01) | |
| *H04W 76/22* | (2018.01) | |
| *H04W 76/20* | (2018.01) | |
| *H04W 76/12* | (2018.01) | |

(52) U.S. Cl.
CPC ........... *H04L 5/0053* (2013.01); *H04W 76/12* (2018.02); *H04W 76/20* (2018.02); *H04W 76/22* (2018.02); *H04W 88/06* (2013.01); *H04W 92/20* (2013.01)

(56) References Cited

U.S. PATENT DOCUMENTS

| | | | |
|---|---|---|---|
| 10,848,280 B2 * | 11/2020 | Van Der Velde | ..... H04L 5/0032 |
| 2004/0146041 A1 | 7/2004 | Lee et al. | |
| 2013/0058234 A1 * | 3/2013 | Yang | ................. H04W 36/0094 |
| | | | 370/252 |
| 2014/0029580 A1 | 1/2014 | Jung et al. | |
| 2015/0382364 A1 * | 12/2015 | Sharma | ................. H04W 72/23 |
| | | | 370/329 |
| 2016/0380779 A1 | 12/2016 | Sharma et al. | |

FOREIGN PATENT DOCUMENTS

| | | |
|---|---|---|
| JP | 2011-514048 A | 4/2011 |
| KR | 10-0932485 B1 | 12/2009 |
| WO | 2011/150262 A1 | 12/2011 |
| WO | 2013/116988 A1 | 8/2013 |
| WO | 2014/010864 A1 | 1/2014 |
| WO | 2014/056130 A1 | 4/2014 |
| WO | 2014/056163 A1 | 4/2014 |
| WO | 2014/084792 A1 | 6/2014 |
| WO | 2014/109603 A1 | 7/2014 |
| WO | 2014/109688 A1 | 7/2014 |

OTHER PUBLICATIONS

China National Intellectual Property Administration, "The First Office Action," Application No. CN201580006516.X, dated Jan. 11, 2019, 17 pages.
Ericsson, "Control plane aspects of dual connectivity," Tdoc R2-134226, 3GPP TSG-RAN WG2 #84, San Francisco, USA, Nov. 11 -15, 2013, 3 pages.
Communication from a foreign patent office in a counterpart foreign application, European Patent Office, "Supplementary European Search Report," Application No. EP 15 74 3032, dated Sep. 4, 2017, 5 pages.
3GPP TR 36.842 V12.0.0 (Dec. 2013), 3rd Generation Partnership Project; Technical Specification Group Radio Access Network; Study on Small Cell enhancements for E-UTRA and E-UTRAN; Higher layer aspects (Release 12), 71 pages.
3GPP TS 36.300 V12.0.0 (Dec. 2013), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 208 pages.
3GPP TS 36.331 V12.0.0 (Dec. 2013), 3rd Generation Partnership Project; Technical Specification Group Radio Access Network; Evolved Universal Terrestrial Radio Access (E-UTRA); Radio Resource Control (RRC); Protocol specification (Release 12), 349 pages.
3GPP TS 36.423 V12.0.0 (Dec. 2013); 3rd Generation Partnership Project; Technical Specification Group Radio Access Network; Evolved Universal Terrestrial Radio Access Network (E-UTRAN); X2 application protocol (X2AP) (Release 12), 144 pages.
LG Electronics Inc., "Small cell addition in Alternative A1" R3-132220, 3GPP TSG-RAN WG3 Meeting #82, San Francisco, USA, Nov. 11 -15, 2013, 2 pages.
NTT DOCOMO, Inc., "TP to TR 36.842 on SeNB modification and release," R2-134565, 3GPP TSG-RAN WG2 #84, San Francisco, USA, Nov. 11 -15, 2013, 6 pages.
United Kingdom Search Report dated Aug. 18, 2014 in connection with UK Patent Application No. GB1401737.0; 2 pages.
International Search Report dated Apr. 24, 2015 in connection with International Patent Application No. PCT/KR2015/001015, 3 pages.
United Kingdom Search Report dated Jun. 24, 2014 in connection with UK Patent Application No. GB1401737.0; 8 pages.
3GPP TSG RAN WG2 #85; "How to provide System Information in Dual Connectivity"; R2-140411; Prague, Czech Republic; Feb. 10-14, 2014; 3 pages.
3GPP TSG RAN2 Meeting #84; "Detailed signaling procedure for dual connectivity"; R2-134266; San Francisco, CA; Nov. 11-15, 2013; 5 pages.
CATT, "RAN1 specification impact in support of dual connectivity", 3GPP TSG RAN WG1 Meeting #76, Feb. 10-14, 2014, R1-140088, 3 pages.
Notification of Due Registration Formalities dated Jan. 5, 2023 in connection with Chinese Patent Application No. 202010788834.9, 12 pages.
Notice of Hearing dated Mar. 22, 2023 from the Indian Patent Office in connection with counterpart Indian Patent Application No. 201637025619, 2 pages.

\* cited by examiner

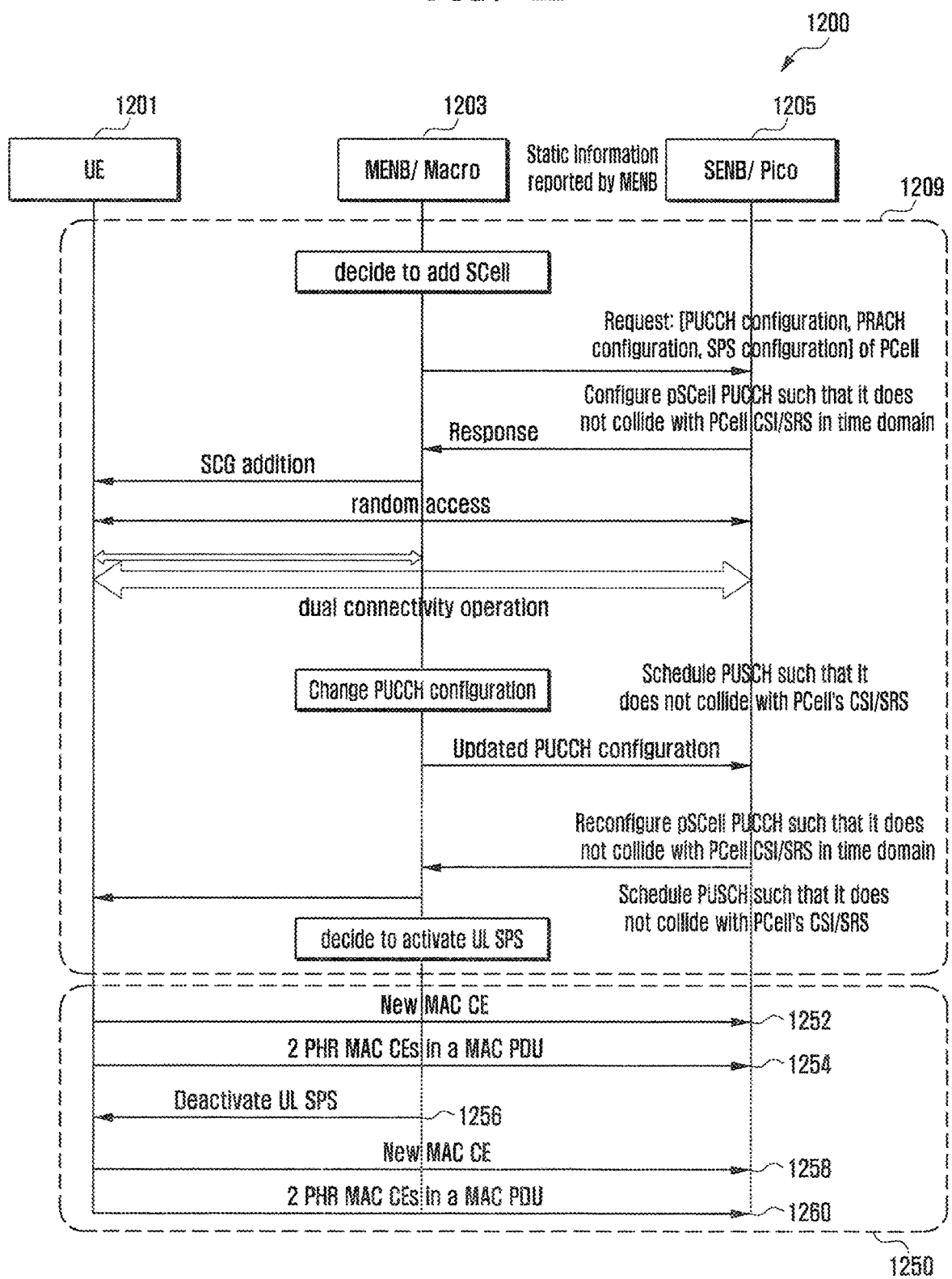

METHOD AND APPARATUS FOR IMPLEMENTING DUAL CONNECTIVITY

CROSS-REFERENCE TO RELATED APPLICATIONS

This application is a continuation of U.S. patent application Ser. No. 16/357,121 filed on Mar. 18, 2019, which is a continuation of U.S. patent application Ser. No. 14/611,016 filed on Jan. 30, 2015 now U.S. Pat. No. 10,237,027 issued on Mar. 19, 2019, which is based on and claims priority under 35 U.S.C. § 119 to United Kingdom Patent Application No. 1401737.0 filed on Jan. 31, 2014, the disclosures of which are herein incorporated by reference in their entirety.

BACKGROUND

1. Field

This invention relates generally to implementing dual connectivity devices in a communications system, and in particular, but not limited to, supporting dual connectivity user equipment being concurrently connected to a master eNodeB and a secondary eNodeB, each of which control one or multiple cells, such as macro cell(s) and small cell(s).

2. Description of Related Art

A recent development in third generation (3G) wireless communications is the long term evolution (LTE) cellular communications standard, sometimes referred to as 4th generation (4G) wireless communications. Both 3G and 4G technologies are compliant with third generation partnership project (3GPP™) standards.

SUMMARY

According to an aspect of the present invention, a method in a wireless communication system supporting a dual connectivity, the method comprising: transmitting, by a base station, a first message including configuration information for a secondary cell group (SCG) to perform a certain action, to other base station; receiving, by the base station, a second message in response to the first message from the other base station; and transmitting, by the base station, a third message based on the second message to a terminal, wherein the configuration information includes multimedia broadcast multicast service (MBMS) interest information.

According to another aspect of the present invention, a method in a wireless communication system supporting a dual connectivity, the method comprising: receiving, by a base station, a first message including configuration information for a secondary cell group (SCG) to perform a certain action, from other base station; and transmitting, by the base station, a second message in response to the first message to the other base station, wherein the configuration information includes multimedia broadcast multicast service (MBMS) interest information.

According to another aspect of the present invention, a base station in a wireless communication system supporting a dual connectivity, the base station comprising: a communication unit configured to transmit and to receive a signal to and from other base station and a terminal; and a controller configured to control the communication unit to transmit a first message including configuration information for a secondary cell group (SCG) to perform a certain action, to the other base station, and to receive a second message in response to the first message from the other base station, and to control the communication to transmit a third message based on the second message to the terminal, wherein the configuration information includes multimedia broadcast multicast service (MBMS) interest information.

According to another aspect of the present invention, a base station in a wireless communication system supporting a dual connectivity, the base station comprising: a communication unit configured to transmit and to receive a signal to and from other base station and a terminal; and a controller configured to control the communication to receive a first message including configuration information for a secondary cell group (SCG) to perform a certain action, from other base station, and to transmit a second message in response to the first message to the other base station, wherein the configuration information includes multimedia broadcast multicast service (MBMS) interest information.

Before undertaking the DETAILED DESCRIPTION below, it is advantageous to set forth definitions of certain words and phrases used throughout this patent document: the terms "include" and "comprise," as well as derivatives thereof, mean inclusion without limitation; the term "or," is inclusive, meaning and or; the phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device is implemented in hardware, firmware or software, or some combination of at least two of the same. It should be noted that the functionality associated with any particular controller is centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 illustrates an example message sequence chart for SPS activation of a dual connectivity UE according to this disclosure.

Figure 1:
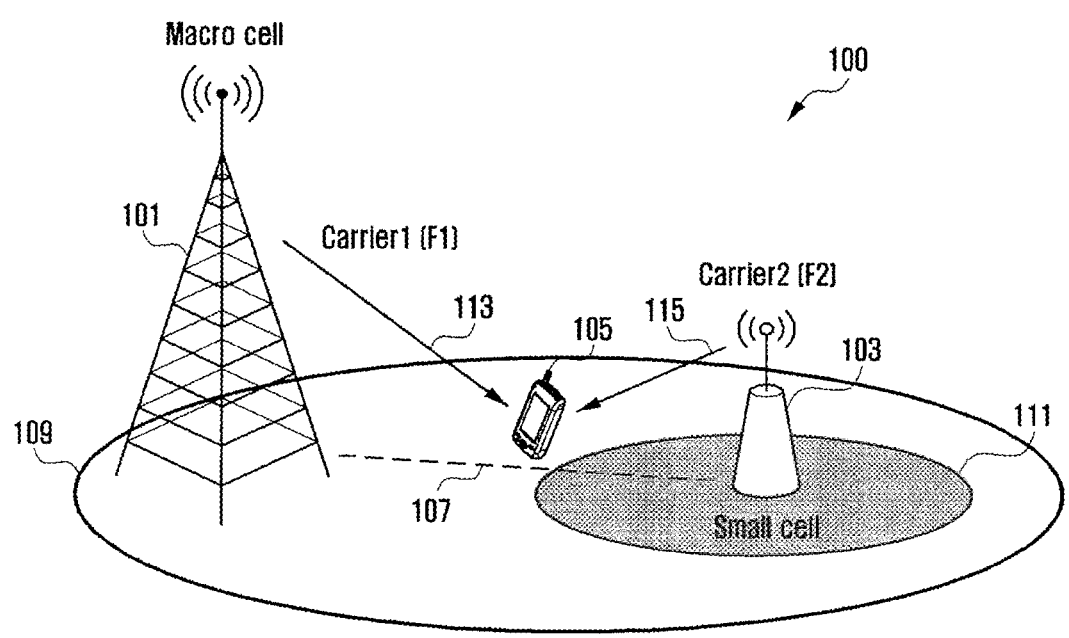
FIG. 1 illustrates an example simplified architecture diagram supporting a dual connectivity UE according to this disclosure.

Skilled artisans will appreciate that elements in the figures are illustrated for simplicity and clarity and have not necessarily been drawn to scale. For example, the dimensions or relative positioning of some of the elements in the figures are exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will be further appreciated that certain actions or steps are described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure are implemented in any suitably arranged communication system and electronic device. Although example embodiments of this disclosure are described with reference to dual connectivity UEs, it is envisaged that some aspects of this disclosure are not so constrained or limited. Example embodiments are described with reference to radio access networks, which term encompasses and is considered to be equivalent to and interchangeable with communication cells, namely the facilitation of communications within a cell that accesses other parts of the communication system as a whole.

Increasing the number of network nodes, and thereby situating them physically closer to user terminals, is one important and useful mechanism to improve traffic capacity and extending achievable user data rates of a wireless communications system. In cellular systems, network densification is achieved by deployment of complementary low-power nodes under the coverage of an existing cellular macro-node layer. In such a deployment, the low power nodes provide very high traffic capacity and very high user throughput locally, for example in indoor and outdoor hotspot positions.

Some Standard activities have focused on ensuring a high degree of interworking between the macro and low power layers, including different forms of macro assistance to the low-power layer as well as dual layer connectivity. Dual connectivity refers to an operation of a user equipment (UE) that is able to consume radio resources provided by at least two different network points, such as a macro-node and a low-power node, connected via a non-ideal backhaul. With existing carrier aggregation (CA) in LTE, all serving cells the UE is configured with are controlled by one eNB. In case of dual connectivity, some of the UE's serving cells are controlled by one eNB while others are controlled by another eNB, the respective control being handled by either a macro-cell eNodeB (eNB) or a small cell eNB (each of which could control macro and small cells). The communications in each cell to or from UEs typically are supported by a respective base station, referred to as evolved NodeB (eNB), with one eNB supporting communications to or from each cell. If the UE is a dual connectivity UE, its communications to or from the eNB sometimes differ, such as one eNB (Master eNB) is overall responsible for the controlling the radio connection of the UE whilst the one or more other eNBs (Secondary eNBs) are merely involved in providing additional radio resources.

Referring to FIG. 1, a known simplified architecture diagram 100 illustrates dual connectivity for a wireless subscriber unit, sometimes referred to as a terminal device, such as a UE according to this disclosure. The known simplified architecture diagram 100 comprises a macro cell eNB 101, a small cell eNB (sometimes referred to as an access point) 103, and a dual connectivity UE 105. The macro cell eNB 101 is connected to the small cell eNB 103, both being engaged in dual connectivity, via a non-ideal backhaul 107, generally an X2 (based on X2) interface that specifies some additional procedures for coordinating aspects relevant for dual connectivity. Macro cell eNB 101 supports communications over a coverage area 109, sometimes referred to as a cell, which encompasses the dual connectivity UE 105 and at least a portion of a small cell coverage area 111. The dual connectivity UE 105 is configured with a serving cell 109 at carrier frequency F1 113 from macro cell eNB 101 and a serving cell 111 at carrier frequency F2 115 small cell eNB 103, which in this case are at different frequencies.

Dual connectivity operation only applies in radio resource control (RRC) state RRC_CONNECTED. Furthermore, the Radio Resource Control signaling is exchanged between the dual connectivity UE and the MeNB, although part of the configuration information originate from the SeNB. According to current RRC specifications, the dual connectivity UE 105 is configured to provide information to assist the network in which it resides. This information includes, amongst other things, UE status information, comprising power preference indication (PPI), which is an indication as to whether the dual connectivity UE 105 prefers power saving, a proximity indication as to whether the dual connectivity UE 105 is in proximity to a closed subscriber group (CSG) cell, indications of having radio link failure (RLF) information, connection establishment failure (CEF) information or minimization of drive test information available, information to assist the network to avoid in device coexistence (IDC) and multimedia broadcast multicast service (MBMS) interest information, which indicates whether a dual connectivity UE 105 is interested to receive MBMS via a multicast radio bearer (MRB) on a particular frequency. Notably, this information is currently not available to SeNB, whereas access to this information could be very beneficial to the SeNB.

In the case of dual connectivity UEs, the macro cell eNB 101 and small cell eNB 103 each comprise their own independent scheduler, required to optimize the use of varying radio conditions. Thus, a situation arise where there are two eNBs, both independently dynamically schedule UL transmissions for the dual connectivity UE, whilst they have to share the UL power that the dual connectivity UE use for these transmissions. If, for the same moment in time (such as a subfame), both eNBs allocate a large grant to the dual connectivity UE, the dual connectivity UE have insufficient power to handle this and will have to scale the power of the different transmissions. In such a case the time or frequency resources will not be used optimally from a network capacity perspective.

Currently, in order to avoid this power limited mode of operation, the evolved-universal mobile telecommunication system terrestrial radio access network (E-UTRAN) configure the UE to provide assistance information to avoid this uplink power limitation such as by configuring Power Head-Room (PHR) reporting. UEs in this situation are generally configured to send PHR concerning each serving cell, which includes a report detailing an amount of spare power that would still be available (assuming that all available UE power would be used for a physical uplink shared channel (PUSCH) transmission in the concerned cell. If there is no PUSCH transmission, the UE assumes a transport block of a reference size, while for the PCell the UE provides a separate report for the physical uplink control channel (PUCCH). Based on the PHR report, the eNB estimate whether the UE was power limited, in which case, it would have utilized power scaling. The eNB generally utilizes this information when granting resources to the UE for future uplink transmissions.

A dual connectivity UE, such as UE 105, is assumed to provide a PHR report to each eNB. However, it is not clear from the current Standards documents what information the dual connectivity UE 105 should include in the PHR reports for the macro cell eNB 101 and the small cell eNB 103. It has been proposed that current dual connectivity UEs 105 are required to provide a PHR report concerning all cells to each eNB 101, 103 such as MeNB would receive PHR concerning cells in the secondary cell group. With such an approach, it is possible for each eNB 101, 103 to obtain a complete picture of the transmission power usage of relevant dual connectivity UEs, and therefore estimate whether dual connectivity UEs were power limited and utilized power scaling. A problem with the above mentioned approach is that PHR reports generated when a relevant dual connectivity UE is power limited, not necessarily be relevant in the near future, as the uplink (UL) power limitation status change rapidly with varying uplink data rates and radio link quality.

Example embodiments of this disclosure are described with reference to providing dual connectivity terminal UE status information, notably referring to status information that relates to the specific dual connectivity UEs in the described implementation, rather than imply that the information is solely specific to dual connectivity UEs, as this information itself has no specific relevance to the concept of dual connectivity. Thus, the status information is used to make the SeNB aware of the UE status, where the UE is configured as a dual connectivity UE.

Furthermore, the inventors have recognized and appreciated that two eNBs concurrently communicating with a dual connectivity UE 105 each grant UL resources in which the UE transmits simultaneously. In such a scenario, the UE may well not have the transmit power required power to perform these simultaneous transmissions. In one example, this problem is solved by enhancement of the power headroom (PHR) reporting. In another example, the MeNB provides an indication to the SeNB information regarding persistent or periodic UL transmissions that it has assigned to the UE.

Thus, example embodiments of this disclosure are also described with reference to provision of semi-persistent scheduling (SPS) activation such as a master eNB is aware of the SPS, and example embodiments propose a mechanism to make the SeNB aware also. As such, various examples are described that concern transfer of information concerning legacy functions, towards a dual connectivity specific node, such as a secondary eNB (SeNB).

Figure 2:
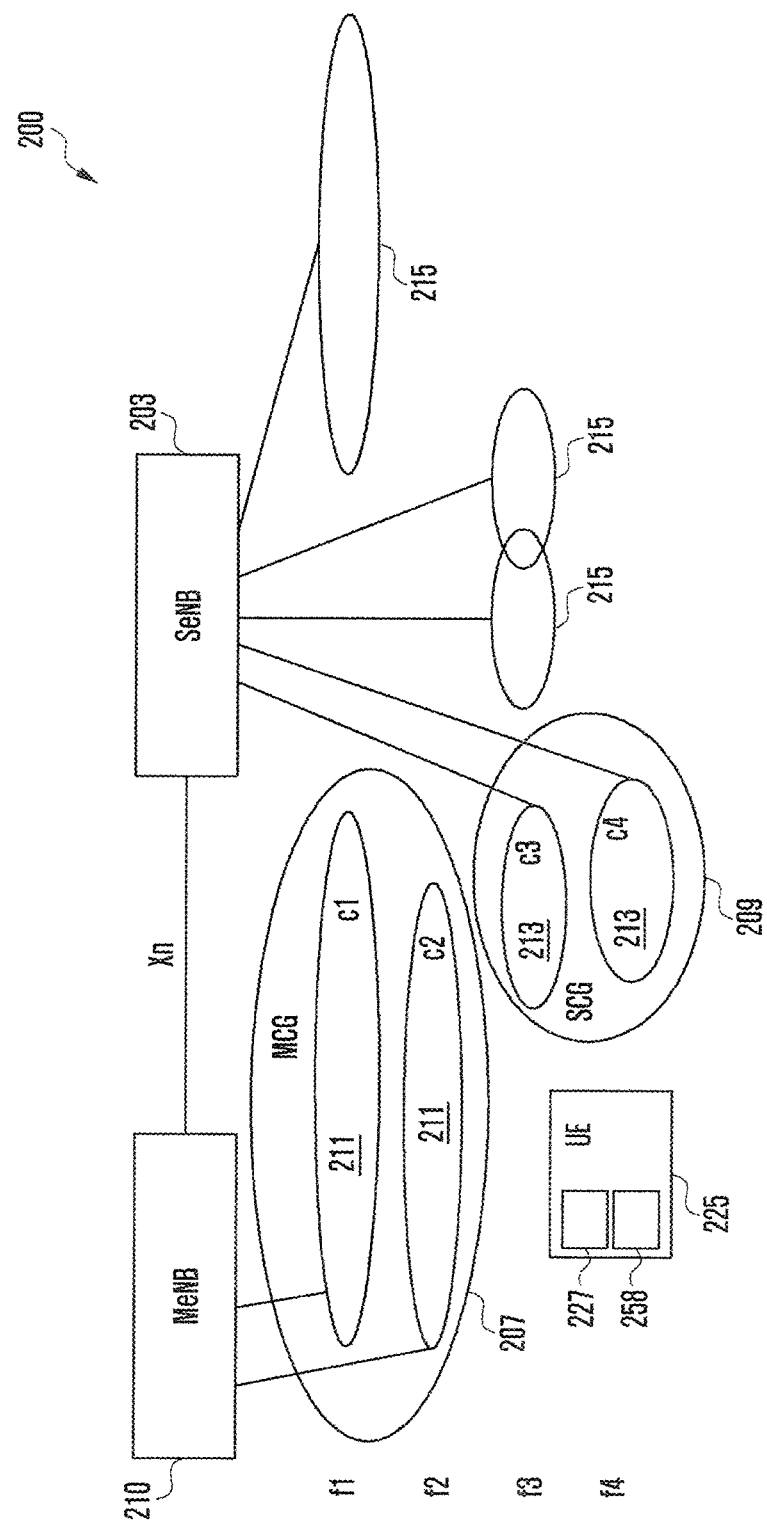
FIG. 2 illustrates an example 3GPP™ LTE cellular communication system adapted according to this disclosure.

Referring now to FIG. 2, part of a wireless communication system 200 is shown in outline, in accordance with one example embodiment of this disclosure. In this example embodiment, the wireless communication system 200 is compliant with, and contains network elements capable of operating over, an Evolved-UMTS Terrestrial Radio Access Network (E-UTRAN) wireless communication system, which is currently under discussion in the third Generation Partnership Project (3GPP™) specification for long term evolution (LTE), based around Orthogonal Frequency Division Multiple Access (OFDMA) in the downlink (DL) and Single Carrier Frequency Division Multiple Access (SC-FDMA) in the uplink (UL), as described in the 3GPP™ TS 36.xxx series of specifications. Within LTE, both time division duplex (TDD) and frequency division duplex (FDD) modes are defined.

The part of the wireless communication system 200 architecture comprises at least two eNodeBs (evolved NodeBs) 210, 203 which perform many standard base station functions. A wireless communication system will typically have a large number of such infrastructure elements where, for clarity purposes, only a limited number are shown in FIG. 2.

In this example, there is a first eNB 210, denoted master MeNB, and a second eNB 203, denoted secondary SeNB operably coupled to each other via an X2 interface. MeNB 210 is denoted as the master eNB with respect to dual connectivity UE 225, as it currently is served by MeNB 210, whereas second eNB 203 is denoted as the SeNB with respect to dual connectivity UE 225, as it may not be the primary eNB serving dual connectivity UE 225. In some other examples, eNB 203 is a master MeNB for some UEs and a secondary SeNB for other UEs. Similarly, eNB 210 is a secondary SeNB for some UEs and a master MeNB for other UEs.

FIG. 2 illustrates two groups of serving cells configured for UE 225 such as a first cell group 207 associated with the (first) MeNB 210, denoted a master cell group (MCG), and a second cell group 209 associated with the (second) SeNB 203, denoted a secondary cell group (SCG). The MCG includes one cell providing some specific functionality: the primary Cell (PCell). Likewise, the SCG includes a cell with specific but different functionality: the primary Secondary Cell (PSCell). All other serving cells are referred to as Secondary Cells (SCells).

In some examples, the first cell group 207 comprises a number of macro cells, a number of small cells or a mixture of both (or any other cell type) 211. The second cell group 209 also comprises a number of macro cells, a number of small cells or a mixture of both (or any other cell type) 213. Further, there are some further cell groups that are not currently available to dual connectivity UE 225, denoted as 215.

Generally, the dual connectivity UE 225 is agnostic of the node controlling a particular cell. Each UE 225 comprises at least a transceiver unit 227 (such as a communication unit) operably coupled to signal processing logic 258 (such as controller) (with one UE illustrated in such detail for clarity purposes only). The wireless communication system comprises many other UEs 225 and eNBs 210, 203, providing multiple opportunities for wireless communication units accessing the communication system via radio access networks and radio access nodes, which for clarity purposes are not shown.

In some examples, two wireless access nodes, such as MeNB 210 and SeNB 203 are operably coupled to a dual connectivity UE 225. The first wireless access node is deemed a master eNB (MeNB). In some examples, the MeNB 210 is used to provide solid connectivity with robust mobility performance by use of macro-cells for the dual connectivity UE 225 with a core network (not shown), whereas the SeNB 203 is arranged to provide additional radio resources for the dual connectivity UE 225.

Thus, in other examples, it is envisaged that the MeNB and SeNB is interchanged. In some examples, it is envisaged that the MeNB support communications by one or more macro cells and the SeNB support communications by one or more small cells. In other examples, it is envisaged that the MeNB and SeNB support communications in the same or similar cell size, such as both support communications by one or more macro cells or both support communications by one or more small cells. Further, in some examples, it is envisaged that an eNB (either MeNB or SeNB) control both macro and small cells; or an eNB function as a MeNB for one UE and the same eNB function as a SeNB for another UE, such as whether an eNB is an MeNB or an SeNB for a particular UE is dependent on the role or functionality performed by the eNB.

In some examples, the MeNB 210 is arranged to transmit 223 a full or a subset of UE status information to one or more SeNB 203. This comprise, for example, one or more of in device coexistence (IDC) information, required for problems requiring time division multiplexing (TDM) solutions and PPI, for configuring discontinuous reception (DRX) states. In some examples, the subset of UE status information sent to an SeNB may not comprise multimedia broadcast multicast service (MBMS) interest information, or proximity information. Therefore, in some examples, if one or more SeNB(s) 203 connects with a dual connectivity UE 225, the MeNB 210 forwards UE status information to the SeNB(s) 203. Further, the UE status information that is forwarded is a subset of UE status information received by the MeNB 210.

In some examples, MeNB 210 is arranged to initiate forwarding of UE status information when establishing a secondary cell group (SCG) 209, such as a group of cells that the UE is configured with that are controlled by the SeNB 210. Alternatively, or additionally, MeNB 210 forwards a change of UE status information as and when such a change occurs. Further, in some examples, the MeNB 210 only forwards initial UE status information if it is deemed essential, useful or beneficial for the one or more SeNB 203 to support communications with the dual connectivity UE, for example if the UE status information comprises IDC information required for TDM solutions.

Further, in some examples, the MeNB 210 is arranged to initiate forwarding of UE status information, or a subset thereof, if the MeNB(s) 210 receives (changed) UE status information. Therefore, in some examples, MeNB 210 is arranged to forward UE status information to the SeNB 203 when the MeNB 210 receives updated status information from dual connectivity UE 225. Further, in some examples, the MeNB 210 is arranged to only forward up-dated UE status information, or a subset thereof, if it is the updated information is deemed essential or beneficial for the concerned SeNB.

In some examples, a source MeNB is arranged to, during a handover operation involving change of MeNB, forward UE status information, or a subset thereof, to one or more target MeNBs. Therefore, upon handover, a source MeNB forwards UE status information to a target (new) MeNB, whilst the UE repeats the UE status provided less than one second preceding receipt of a handover command, for example upon handover there are two options: a) the UE repeats the status information, or b) the source MeNB, for example MeNB, transfers the status information to the target MeNB, and the UE only repeats in case there was a late change that has arrived too late at the source MeNB to be forwarded (such as the one second window).

In some examples, due to these procedures for transfer of status information upon change of MeNB, the target MeNB obtains up-to-date UE status information. However, the target MeNB can be unable to detect whether or not the UE status information changed upon change of MeNB. Thus, in case the SeNB remains the same upon change of MeNB, the target MeNB is arranged to transfer the updated UE status information to the SeNB, provided that it is deemed essential or beneficial for the concerned SeNB. Correspondingly, in some examples, the SeNB should clear the UE status information upon change of MeNB. In some examples, forwarding of UE status information, for example relating to proximity, failure and logged measurement information, may not occur. Instead, the UE repeats transmissions relating to proximity, failure and logged measurement information, for example, following a handover, to the target MeNodeB.

In some examples, MeNB 210 is operable to determine the functionality of one or more SeNB(s) 203, allowing MeNB 210 to determine whether received data is relevant or beneficial for the one or more SeNB(s) 203. In some examples, MeNB 210 considers MBMS and proximity information to be non-essential or non-beneficial for a particular one or more SeNB(s) 203 and, therefore, determine not to forward this information onto the particular one or more SeNB(s) 203 if they do not support this functionality. Further, in some examples, MeNB 210 considers that IDC status information is not essential or not beneficial for a particular one or more SeNB(s) 203 if, for example, the one or more SeNB(s) 203 do not support the relevant functionality, or the IDC status information does not include assistance information related to a time division multiplex (TDM) solution or only includes assistance information concerning frequencies not supported by the SeNB(s) 203. Furthermore, in some examples, MeNB 210 considers that IDC information is not essential or not beneficial for a particular one or more SeNB(s) 203 if it only concerns IDC status information affecting frequency division multiplexing (FDM) solutions. This is due to FDM solutions being controlled by the MeNB 210.

In some examples, the MeNB 210 determines whether to forward a full set of UE status information to one or more SeNB(s) 203, or a subset of UE status information. Therefore, in some examples, the MeNB 210 determines that only a subset of UE status information that is essential or beneficial for one or more SeNB(s) 203 should be forwarded. In some further examples, a determined subset of UE status information may always be provided to one or more relevant SeNB(s) 203. In some other examples, the determined subset of UE status information can only comprise information parameters that have changed from the last time they were signaled to one or more SeNB(s) 203, generally referred to as delta signaling.

In some examples, it is generally assumed that for a UE configured with dual connectivity, the MeNB handles the configuration of measurements and the related gaps in transmissions. In some examples, the dual connectivity UE provides IDC indications for frequencies for which, say, a measurement object is configured. For these, the dual connectivity UE indicates the affected frequencies (also indicating the direction of IDC interference) and it also provides TDM information, such as either a discontinuous receive (DRX) pattern or a pattern comprising one or more subframe patterns.

Figure 3:
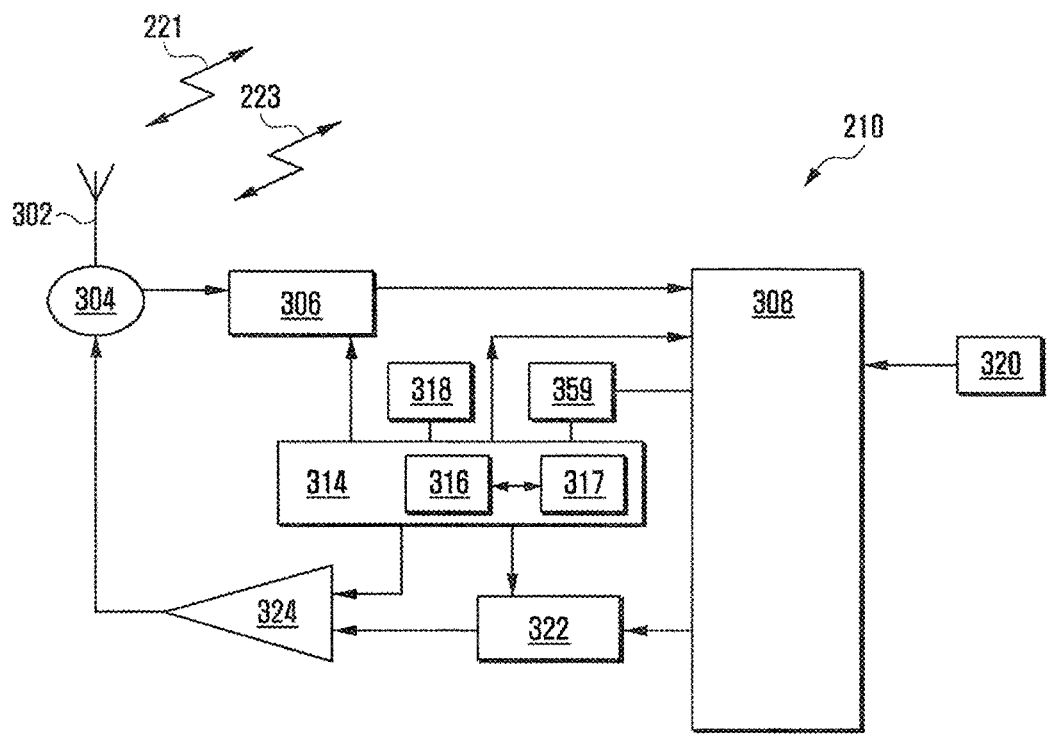
FIG. 3 illustrates a block diagram of example wireless communication units according to this disclosure.
Figure 3:
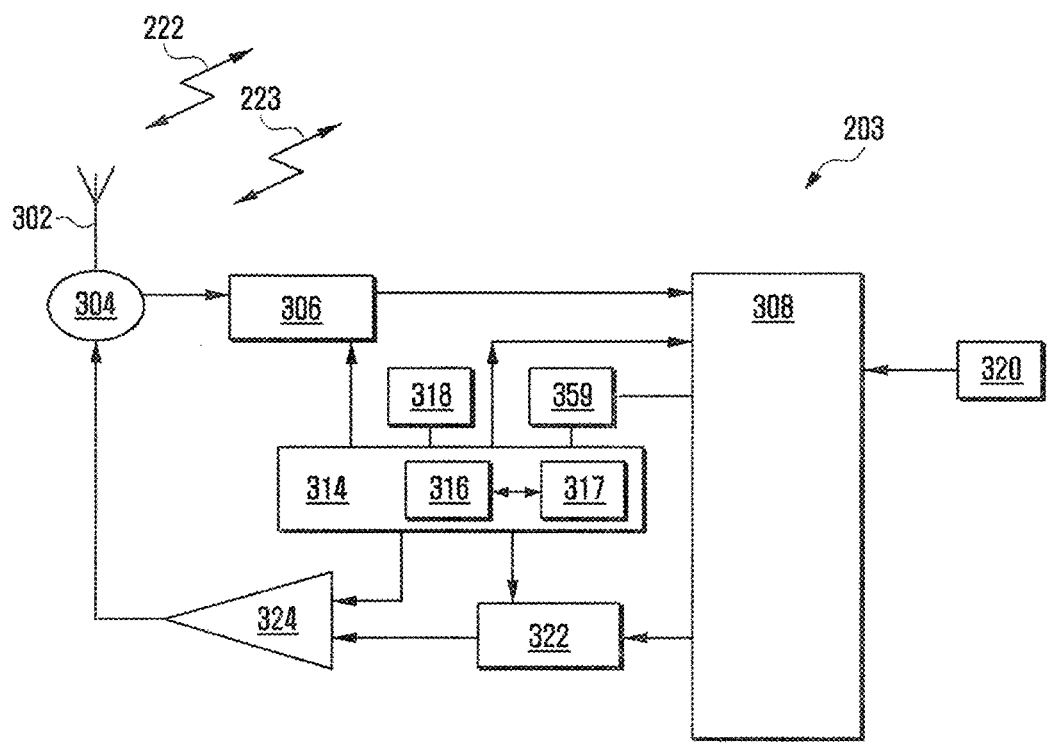

Referring now to FIG. 3, block diagrams of wireless communications units, for example MeNB 210, and SeNB(s) 203, adapted in accordance with some example embodiments of this disclosure are shown. The wireless communication units 210, 203 contain an antenna 302, for receiving transmissions, coupled to an antenna switch or duplexer 304 that provides isolation between receive and transmit chains within the wireless communication units 210, 203. One or more receiver chains, as known in the art, include receiver front-end circuitry 306 (effectively providing reception, filtering and intermediate or base-band frequency conversion). The receiver front-end circuitry 306 is coupled to a signal processing module 308 (generally realized by a digital signal processor (DSP)). A skilled artisan will appreciate that the level of integration of receiver circuits or components is, in some instances, implementation-dependent.

The controller 314 maintains overall operational control of the wireless communication units 210, 203. The controller 314 is also coupled to the receiver front-end circuitry 306 and the signal processing module 308. In some examples, the controller 314 is also coupled to a buffer module 317 and a memory device 316 that selectively stores operating regimes, such as decoding or encoding functions, synchronization patterns, code sequences, and the like. A timer 318 is operably coupled to the controller 314 to control the timing of operations (such as transmission or reception of time-dependent signals) within the wireless communication units 210, 203. As regards the transmit chain, this essentially includes an input module 320, coupled in series through transmitter or modulation circuitry 322 and a power amplifier 324 to the antenna 302, antenna array, or plurality of antennas. The transmitter or modulation circuitry 322 and the power amplifier 324 are operationally responsive to the controller 314.

The signal processor module 308 in the transmit chain is implemented as distinct from the signal processor in the receive chain. Alternatively, a single processor is used to implement a processing of both transmit and receive signals, as shown in FIG. 3. Clearly, the various components within the MeNB 210, SeNB 203 is realized in discrete or integrated component form, with an ultimate structure therefore being an application-specific or design selection. In some examples, MeNB 210 receives communications 221 from one or more dual connectivity UEs 225, wherein the communications 221 comprises status information relating to the one or more dual connectivity UEs 225. In response to this information, the MeNB 210 signals, via 223, a message to SeNB 203 comprising the full status information received from the one or more UEs 225, or a subset of information to the SeNB 203.

In response to the message 223 from the MeNB 210, the SeNB 203 configures itself to communicate with the one or more dual connectivity UEs 225 via communications 222. In some examples, the controller 314 of the eNB 210 is operable to determine the functionality or capability of the SeNB 203. Therefore, in response thereto, the controller 314 is operable to determine what dual connectivity UE 225 status information is relevant or beneficial for the SeNB 203 based on its functionality or capability, and subsequently transmit the full status information or a subset of the status information based on the determination.

Thus, in some examples, a wireless access node (such as a master eNB (MeNB)) 210 is described for a wireless communication system that comprises a first wireless access network and a second wireless access network supporting a dual connectivity terminal device. In some examples, the UE is configured with (carrier aggregation (CA)) cell groups such as a master cell group (MCG) and a secondary cell group (SCG), where each cell group is controlled by a different eNB. In some examples, additionally or alternatively, the UE is considered as being arranged to communicate with both the wireless access node (MeNB) 210 on the first wireless access network and a second wireless access node (such as a secondary eNB 203 (SeNB)) on the second wireless access network. The wireless access node comprises: a transceiver (such as a communication unit), a processor 308 (such as a controller), operably coupled to the transceiver and arranged to collate and forward at least a portion of dual connectivity terminal device status information to the second wireless access node upon at least one from a group of: establishment of a group of serving cells associated with the second wireless access node (SeNB), receipt of updated dual connectivity terminal device status information from the dual connectivity terminal device.

Furthermore, in some examples, a wireless access node (such as a SeNB) is described for a wireless communication system that comprises a first wireless access network and a second wireless access network supporting a dual connectivity terminal device arranged to communicate with both a first wireless access node (such as a MeNB) on the first wireless access network and the wireless access node (such as the SeNB) on the second wireless access network. In some examples, a cell group includes both macro cells and small cells. For example, a typical use case is that a MCG only comprises one or more macro cells whilst an SCG only comprises one or more small cells.

The wireless access node (such as MeNB) comprises: a transceiver; a processor 308, operably coupled to the transceiver and arranged to receive at least one from a group of: a portion of dual connectivity terminal device status information from the first wireless access node; dynamic configuration information concerning uplink transmissions to the second wireless access node from the dual connectivity terminal device following at least one from a group of: establishment of a group of serving cells associated with the wireless access node, a change in dual connectivity terminal device status information following at least one from a group of: establishment of a group of serving cells associated with the wireless access node, a change in dual connectivity terminal device status information.

Figure 4:
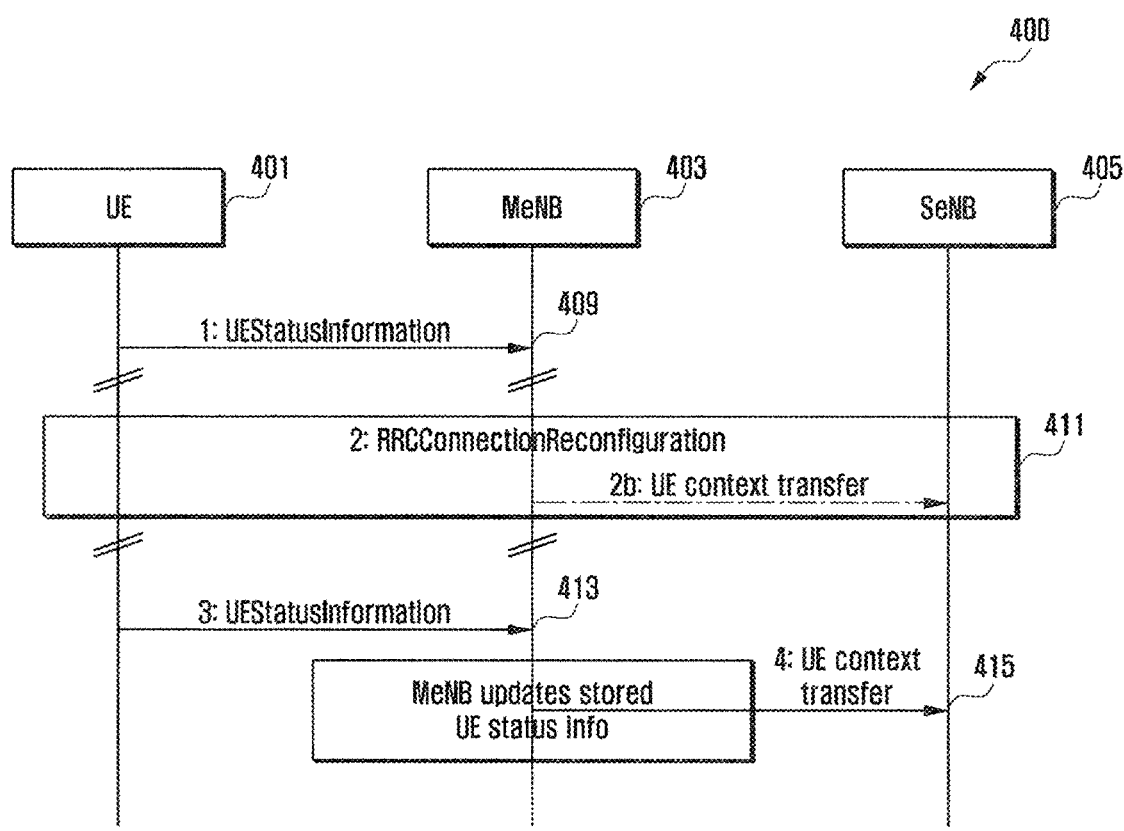
FIG. 4 illustrates an example simplified message sequence chart for UE status forwarding according to this disclosure.

Referring to FIG. 4, a simplified message sequence chart 400 for UE status forwarding is illustrated, comprising a UE 401, MeNB 403, SeNB 405. In this example, modifications to existing message flows or signaling may not introduce changes affecting UEs and UE status reporting procedures, currently defined for the Uu interface. Further, in some examples, there is no change to UE status forwarding across the X2 interface, for example between eNBs during a handover procedure. However, in other examples, modifications to existing message flows or signaling, such as semi-persistent scheduling as described with respect to FIG. 8 and FIG. 9, will introduce changes affecting UEs and signals exchanged across the Uu interface, currently defined for the Uu interface. Initially, in this example at 409, the UE 401 provides some or all of status information to the MeNB 403.

In accordance with some examples, the MeNB 403 decides to reconfigure, remove or add one or more secondary cells (Scells) to the SCG, thereby requiring a change to the dual connectivity UE or providing dual connectivity to the UE. At this point, the MeNB 403 forwards UE status information, which was collected at 409, to the one or more SeNB(s) 405 at 411. A large portion of the SCG configuration is assigned by the SeNB 405, which is signaled to the UE via the MeNB 403. In some further examples, the MeNB 403 forwards UE status information when initiating reconfiguration procedure towards the SeNB 405 to add or modify one or more SCell(s). In some examples, the MeNB 403 forwards UE status information to the SeNB 405 within an X2 message that is used specifically for the transfer of this UE status information. In some examples, the MeNB 403 forwards UE status information to the SeNB 405 within an X2 message used to request the SeNB 405 to add or modify one or more SCell(s) in order to establish a new SCG, for example request an initiate SCG re-configuration. The message is sometimes referred to as SCG-Config, whereas in other scenarios the message is referred to as, for example, an SeNB addition or modification request, or the like In some examples, it is envisaged that any acknowledgement (Ack) message is located immediately following the SCG Config, whilst in other examples it is contemplated that the Ack message be located at the end of the message sequence chart, such as after a number of SCG-Config messages. In some examples, the X2 interface is assumed to use the same transport layer protocol as S1 or X2, such as SCTP over IP for C-plane and GTP-U over UDP or IP for U-plane.

In some examples, the UE 401 provides the MeNB 403 with updated (changed) status information at 413, for example if the UE 401 has changed position within the network or upgraded its capabilities or services, or the like. In response to receiving updated (changed) status information at 413, the MeNB 403 updates its stored UE status information and signals this to the SeNB 405 at 415. In some examples, the signaling at 415 to the SeNB 405 comprises a new X2 message or procedure, transmitted over an X2 interface for example, introduced for the transfer of UE status information. This may not include an MeNB 403 command, nor any updated grant or restriction, configuration of UE 401 capability.

In some examples, an unconfirmed flow (class 2) message is used when only forwarding UE status information, otherwise a confirmed flow (class 1) message is used. Alternatively, in some examples, a class of message used depends on the initial message contents. In some examples, the updated status information 413 comprises one or more of, or a part of, InDeviceCoexIndication, UEAssistanceInformation or MBMSInterestIndication messages. In some examples, a separate message specifically used for this purpose such as a UE context transfer message is sent at 415. In some examples, the forwarded UE status information comprises the full UE status information received from UE 401. In some other examples, the forwarded UE status information is a subset of information received at 409, which is filtered based on the MeNB's knowledge of the capabilities of the target SeNB 405. In other examples, the MeNB 403 is arranged to only transmit 415 updated or changed information to SeNB 405 that it determines to be relevant or beneficial to the SeNB 405.

Figure 5:
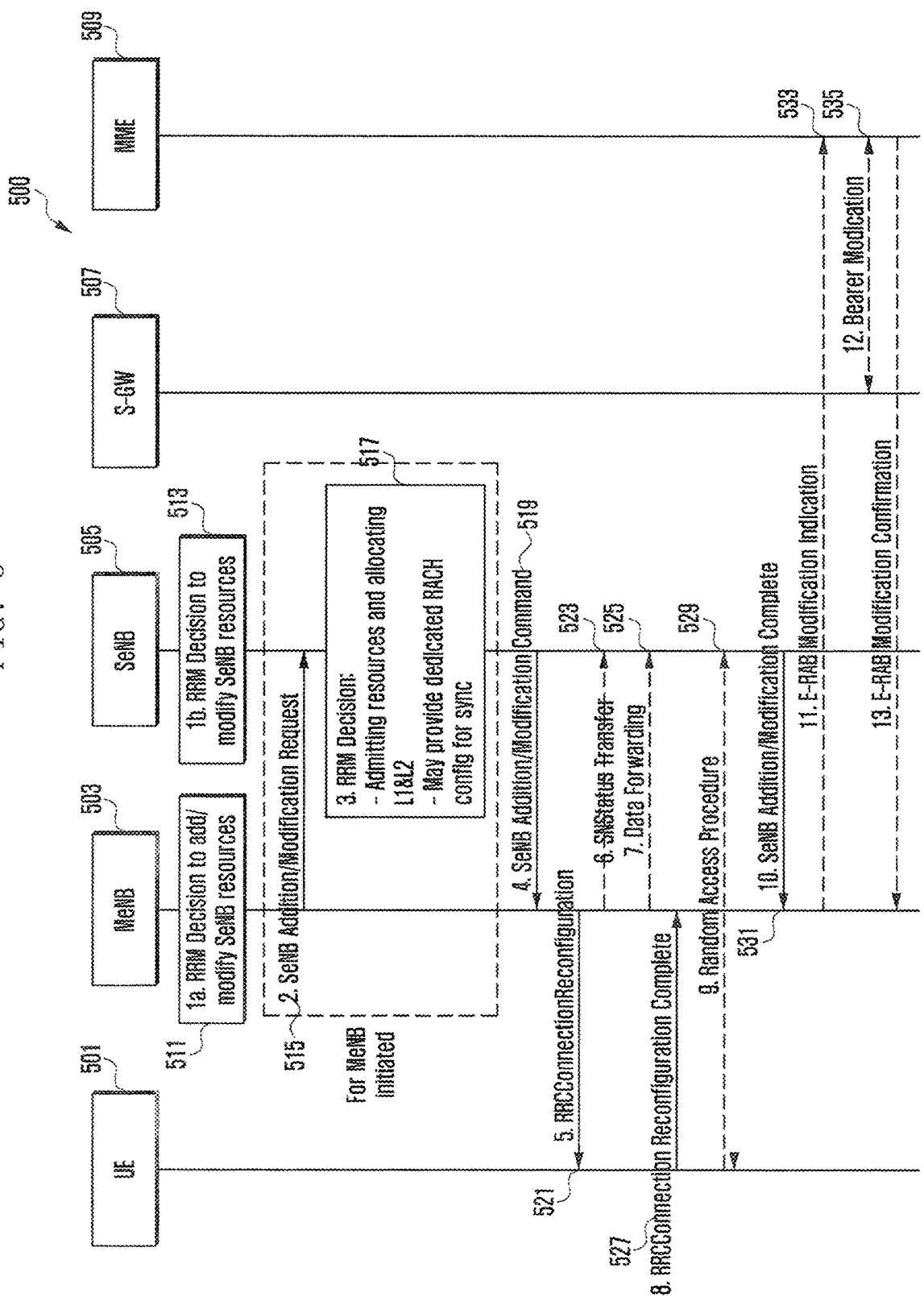
FIG. 5 illustrates an example simplified message sequence chart for a secondary cell addition or modification procedure according to this disclosure.

Referring to FIG. 5, a simplified message sequence chart 500 of a secondary cell addition or modification procedure to a SCG is illustrated. The simplified message sequence chart 500 comprises UE 501, MeNB 503, SeNB 505, S-GW 507 and MME 509. Initially, at 511, a resource radio manager (RRM) signals within the MeNB 503 determines whether to add or modify resources of the SeNB 505. If it is determined that the resources of the SeNB 505 resources are to be added or modified, the MeNB 503 sends a command 513 to the SeNB 505 that it should add one or more cell(s), and then the SeNB 505 decides the configuration of that cell and sends this configuration information via MeNB 503 to the UE 501. In some examples, the MeNB 503 forwards UE status information within a message 515 requesting the SeNB 505 to configure one or more SCells, for example a message 515 used to establish an SCG configuration in case of SCG establishment or addition. This has the advantage that no additional messages need to be transferred to signal the UE status information.

In some other examples, the UE status information is conveyed in a separate message used specifically for UE status forwarding. This message may, for example, is a UE specific class 2 X2 message or procedure, for example specifically designed to transfer UE status or context information. This has an advantage of limiting standards changes, as it would imply that for initial forwarding, the same message as that used for a change of UE status information would be used. In some examples, the MeNB 503 forwards the complete, or a subset of, UE status information to the SeNB 505. In some examples, the MeNB 503 transfers UE status information to SeNB 505 via a SeNB addition or modification request message 515 upon SCG establishment or re-configuration, as well as via, say, an additional, message upon UE 501 status change, wherein the message is used specifically for UE status forwarding.

At 517, the SeNB 505 may, after receiving the forwarded RRM decision, admit resources and allocate L1 and L2 resource. Further, the SeNB 505 provides a dedicated RACH configuration to the dual connectivity UE 501 for synchronization purposes. At 519, the SeNB 505 transmits an addition modification command to the MeNB 503, thereby enabling the MeNB 503 to transmit an RRC Connection-Reconfiguraton message 521 to the dual connectivity UE 501. Subsequently, the MeNB 503 initiates an SN status transfer at 523 and thereafter performs data forwarding at 525. Once the dual connectivity UE 501 has reconfigured its connection, it transmits an RRC ConnectionReconfigurationComplete message 527 to the MeNB 503, before performing a random access procedure 529 with the SeNB 505.

Once the random access procedure 529 from the dual connectivity UE 501 to the SeNB 505 has been initiated, the SeNB 505 transmits an addition or modification complete message 531 to the MeNB 503. In response to addition or modification complete message 531, the MeNB 503 transmits an E-RAB modification indication message 533 to MME 509, wherein the MME 509 subsequently transmits a bearer modification command 535 to S-GW 507 and subsequently transmits an E-RAB modification confirmation 537 to MeNB 503.

Referring to Table. 1, changes to message contents of the SCG establishment or addition message, referred to as, for example, the SCG command, or an SeNB addition or modification request, or the like, are illustrated, in the direction from the MeNB 503 to the SeNB 505.

TABLE 1

| Item | Field | Presence | Description | Notes |
|------|-------|----------|-------------|-------|
| 1 | Message type | M | | |
| 2 | UE Id | M | Some kind of UE identification | No change |

TABLE 1-continued

| Item | Field | Presence | Description | Notes |
|---|---|---|---|---|
| 3 | UE capability | M/O | Used to coordinate the split of UE capabilities between MCG and SCG | No change |
| 4 | UE AS configuration | O | Used to coordinate the split of UE capabilities between MCG and SCG | No change |
| 5 | UE context information | O | Used to transfer UE context information, | Includes the UE status information |

Referring to Table. 2, changes to UE context message contents are illustrated, in the direction of the MeNB 503 to the SeNB 505.

TABLE 2

| Item | Field | Presence | Description | Notes |
|---|---|---|---|---|
| 1 | Message type | M | | |
| 2 | UE Id | M | Some kind of UE identification | As for any UE specific message |
| 5 | UE context information | M | Used to transfer UE context information, | Includes the UE status information |

Figure 6:
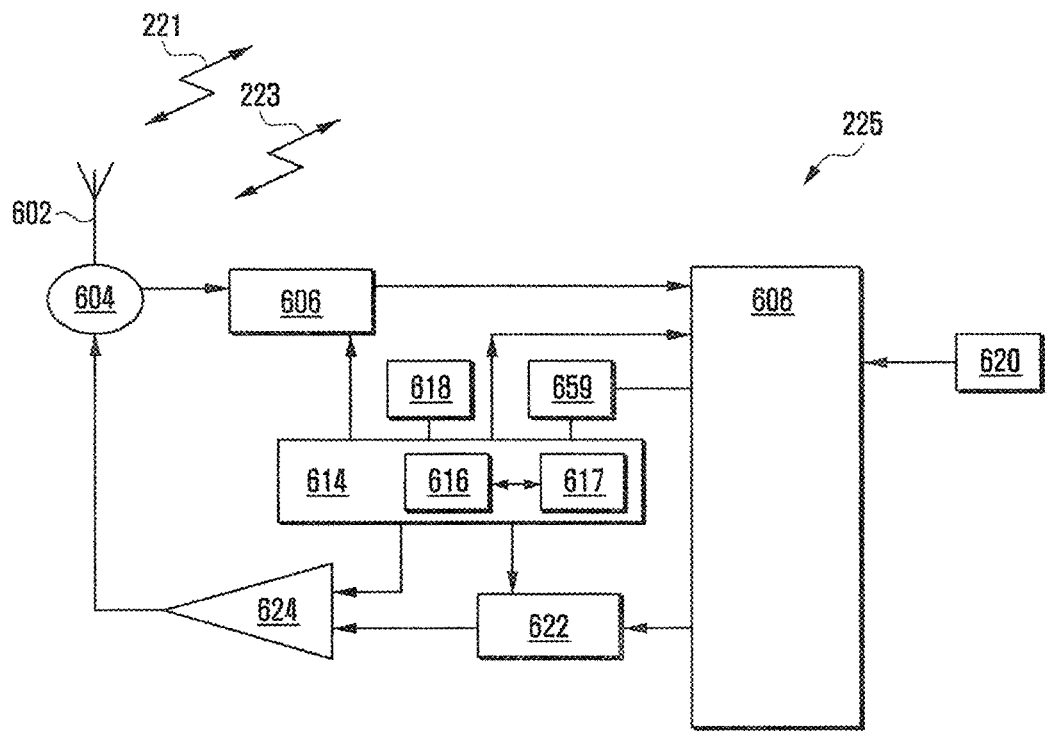
FIG. 6 illustrates a block diagram of example wireless communication units according to this disclosure.
Figure 6:
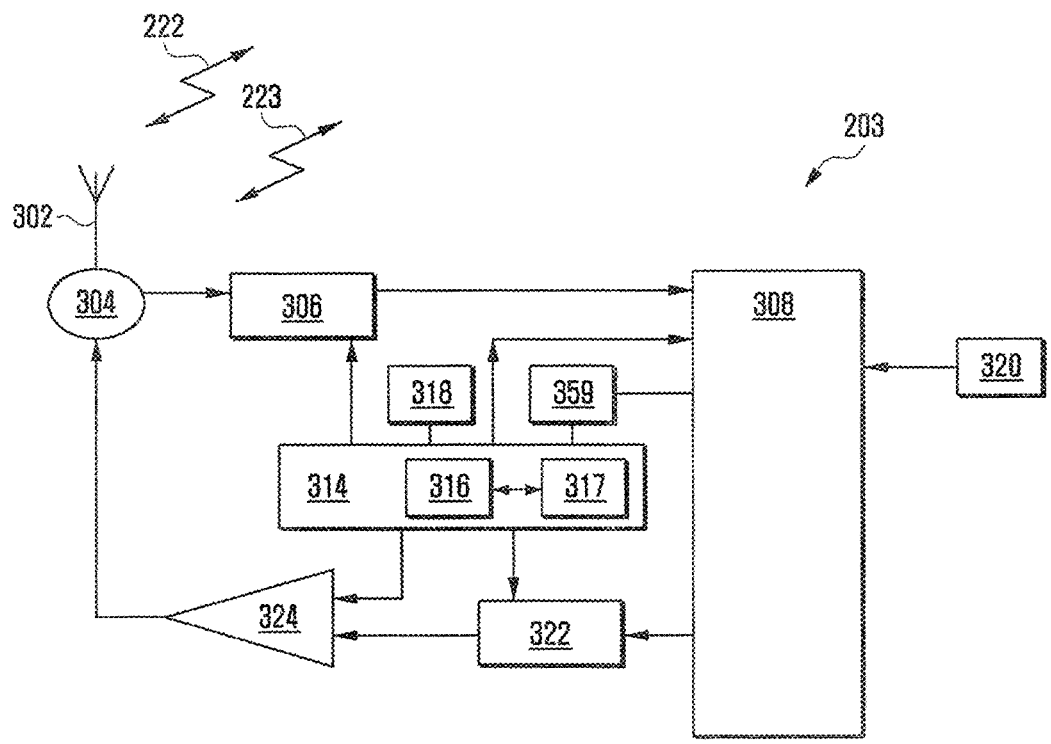

Referring to FIG. 6, a block diagram of wireless communication units, for example UE 225 and SeNB 203, adapted in accordance with some example embodiments of this disclosure, are shown. The wireless communication units 225, 203 comprise similar features to the wireless communication units illustrated in FIG. 3. Therefore, only additional functionality will be described relating to FIG. 6.

In FIG. 6, the wireless communication system again comprises a first wireless access network and a second wireless access network, whereby a dual connectivity terminal device, such as dual connectivity UE 225, is arranged to communicate with both a wireless access node (such as a MeNB 210) on the first wireless access network and a second wireless access node (such as a SeNB 203) on the second wireless access network. The wireless communication units 225 contains an antenna 602, for receiving transmissions, coupled to an antenna switch or duplexer 604 that provides isolation between receive and transmit chains within the wireless communication units . One or more receiver chains, as known in the art, include receiver front-end circuitry 606 (effectively providing reception, filtering and intermediate or base-band frequency conversion). The receiver front-end circuitry 606 is coupled to a signal processing module 608 (generally realized by a digital signal processor (DSP)). A skilled artisan will appreciate that the level of integration of receiver circuits or components is, in some instances, implementation-dependent.

The controller 614 maintains overall operational control of the wireless communication unit 225. The controller 614 is also coupled to the receiver front-end circuitry 606 and the signal processing module 608. In some examples, the controller 614 is also coupled to a buffer module 617 and a memory device 616 that selectively stores operating regimes, such as decoding or encoding functions, synchronization patterns, code sequences, and the like. A timer 618 is operably coupled to the controller 614 to control the timing of operations (such as transmission or reception of time-dependent signals) within the wireless communication unit 225. As regards the transmit chain, this essentially includes an input module 620, coupled in series through transmitter or modulation circuitry 622 and a power amplifier 624 to the antenna 602, antenna array, or plurality of antennas. The transmitter or modulation circuitry 622 and the power amplifier 624 are operationally responsive to the controller 614.

The dual connectivity terminal device, comprises a transceiver and a processor 608, operably coupled to the transceiver and arranged to provide status information concerning uplink transmissions to the second wireless access node (such as the SeNB 203) operating on the second wireless access network.

In some examples, the processor 608 is arranged to provide (dynamic) status information concerning uplink transmissions to the second wireless access node, such as SeNB 203, in response to a change of the status information previously provided to the second wireless access node, such as SeNB 203, or provided initially upon establishment of a secondary cell group (SCG). As has been discussed above, there are cases where a UE has insufficient power to handle all uplink transmissions. In some examples, in order to address this problem, the dual connectivity UE 225 is operable to forward or update the SeNB 203 with MeNB related UL scheduling information.

Figure 7:
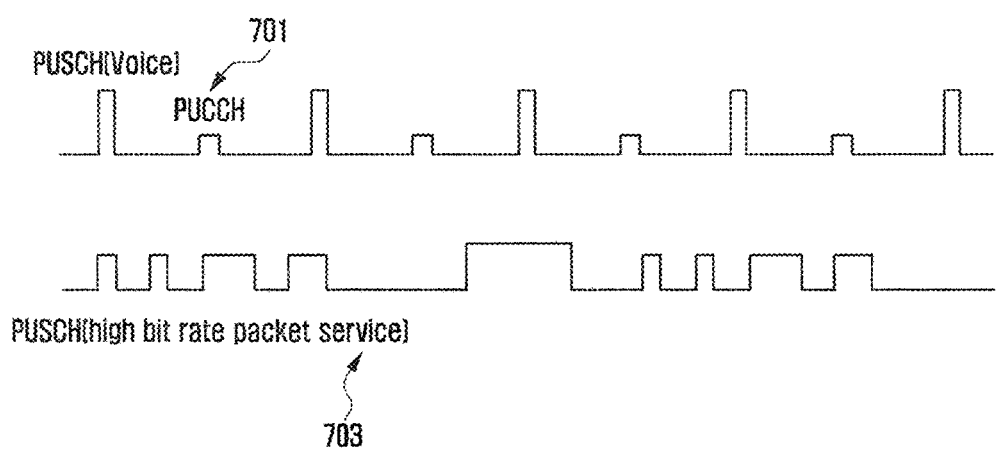
FIG. 7 illustrates an example of uplink data in a PCell and pSCell according to this disclosure.

Therefore, and referring to FIG. 7, a sequence chart 700 illustrates an example of uplink data in a PCell and pSCell is illustrated comprising, PUSCH voice data 701 and PUSCH high bit rate packet service 703. As previously mentioned, uplink power limitations are encountered due to a dual connectivity UE being scheduled by to communicate with both the PCell and pSCell at the same time, with both eNBs in the PCell and pSCell attempting to fully utilize any spare power headroom. It is considered generally that PHR reports reflect the current UL power situation and thus have limited value with respect to predicting the future UL power situation. That is, if the PHR report indicates that the UE has an UL power limitation or shortage, this does not necessarily mean that the UE will be power limited in the near future, as the need to transmit uplink data rate changes as well as the power required to transmit a certain data rate (due to radio link quality changes).

Therefore, in accordance with some examples, it is advantageous to provide the SeNB with dynamic UE configuration information concerning semi-persistent resource allocations by the MeNB, such as uplink (UL) periodic transmissions that are currently configured at the UE. It is noted that the persistent allocations are handled by the normal semi-static configuration that E-UTRAN assigns to the UE, while the information in this example concerns more dynamic information, for example concerning activation of semi-persistent resource allocations, which is not exchanged by RRC but by lower layers which is quicker. Therefore, in some examples, the semi-static configuration information provided to the SeNB covers both PUCCH and PUSCH transmissions from UE to MeNB, and includes at least one of semi-persistent scheduling (SPS) configuration, channel state information (CSI) and sounding reference symbol (SRS) configuration, PRACH configuration and scheduling request configuration.

In some examples, a typical use case is that voice would be transferred via a master cell group (MCG), whilst most other traffic is exchanged via a SCG. To support some more dynamicity with SPS (taking into account that voice is typically bursty in nature), a mechanism has been defined for activating or deactivating the SPS configuration using downlink control information at the physical layer. In other examples, a typical case is for the MeNB to provide this kind of more dynamic information concerning semi-persistent or periodic UL transmissions to the SeNB to avoid UL power limitations. In this manner, the MeNB schedules the UE such that, in SCG cells, no UL transmissions collide with these semi-persistent or periodic MCG UL transmissions. In other examples, the UE provides this more dynamic (SPS activation) information to the SeNB, for example using medium access control (MAC) signaling. After being informed of the activation status, the SeNB is able to avoid scheduling the UE at those MeNB allocated occasions and only when SPS is really activated (such as during the actual speech burst, but not during the silence period in-between).

Figure 8:
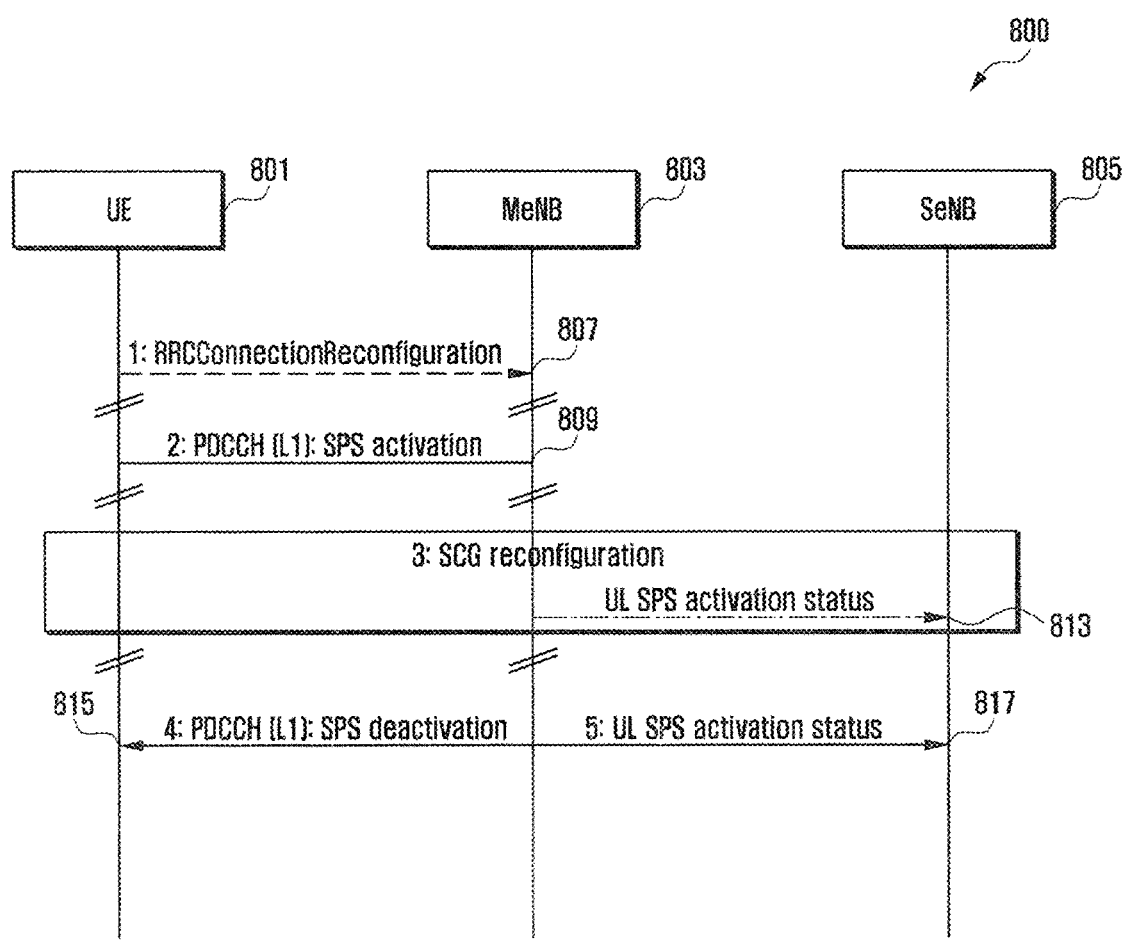
FIG. 8 illustrates an example simplified high level message sequence chart for providing uplink SPS activation according to this disclosure.

In some examples, it is advantageous for a master eNB to provide uplink SPS activation status information, for a particular UE, to a relevant secondary eNB, as described below with respect to FIG. 8 and FIG. 9. Referring to FIG. 8, a simplified high level message sequence for uplink SPS activation status 800 is shown. The simplified high level message sequence chart 800 illustrates communications between dual connectivity UE 801, MeNB 803 and SeNB 805. Initially, the MeNB 803 and the dual connectivity UE 801 employ a RRC re-configuration process, say via RRC ConnectionReconfiguration messages 807, which in this example comprises the MeNB 803 configuring the dual connectivity UE 801 with uplink semi-persistent scheduling (SPS). For example, the MeNB 803 assigns an uplink SPS-configuration, signaled by means of the RRCConnectionReconfiguration message, which includes a pattern specifying periodically repeating uplink scheduling opportunities assigned to dual connectivity UE 801.

Subsequently, the MeNB 803 transmits message 809 to the dual connectivity UE 801, in order to activate the uplink SPS configuration, say via a physical downlink control channel (PDCCH) (Layer 1) SPS activation message. It should be noted that although only one PDCCH message 809 is illustrated in FIG. 8, it is likely that the MeNB 803 regularly or periodically uses activation or deactivation upon every speech burst illustrated, for example as described with respect to FIG. 7. Subsequent to the E-UTRAN (or MeNB 803) adding or configuring or re-configuring a secondary cell group (SCG) comprising one or more SCells controlled by SeNB 805, the UE 801 provides the uplink SPS activation status information to the SeNB 805 via message 813. At some time thereafter, MeNB 1003 will send a further PDCCH (Layer 1) SPS deactivation message to the UE 801 in message 815.

Advantageously, as part of this procedure, the MeNB 803 provides the uplink SPS activation status information to the SeNB 805 via message 813, as well as utilizing the information provided by the E-UTRAN to activate uplink SPS configuration in the dual connectivity UE 801 via message 809. In some examples, message 813 includes a start time, that relates to subframe timing of 809 transmission. Further, and advantageously, the MeNB 803 subsequently signals, via uplink SPS activation status message 817, updated or changed uplink SPS activation status information to the SeNB 805.

In some examples, after the MeNB 803 transmits SPS deactivation message 809 to dual connectivity UE 801, the MeNB 803 subsequently signals a complete dual connectivity UE configuration to the SeNB 805, without including SPS configuration information. In some other examples, the MeNB 803 or the dual connectivity UE signals a dual connectivity UE's uplink SPS activation status to the SeNB 805 by utilising an 'on' or 'off' indication, which in some examples includes a specific start-time and an activation status indicator or flag reflecting the 'on' or 'off' activation status. Note that, in some examples, the semi-static SPS configuration only includes the interval between the subsequent periodic allocations, as the start time is derived from the sub-frame timing in which the UE receives the SPS activation command via a PDCCH (L1). Hence, the start time is dynamic also, and is provided to the SeNB upon every SPS activation.

Referring to Table. 3 below, the contents of the SCG command message (sometimes also referred to as SeNB addition or modification request) contents are illustrated, in the direction of the MeNB 803 to the SeNB 805.

TABLE 3

| Item | Field | Presence | Description | Notes |
|---|---|---|---|---|
| 1 | Message type | M | | |
| 2 | UE Id | M | Some kind of UE identification | No change |
| 3 | UE capability | M/O | Used to coordinate the split of UE capabilities between MCG and SCG | No change |
| 4 | UE AS configuration | O | Used to coordinate the split of UE capabilities between MCG and SCG | No change |
| 5 | UE As configuration, dynamic part | O | Used to transfer UE context information, | Includes the UL SPS activation status information |

Referring to Table. 4, the contents of the UE context indication message contents are illustrated, in the direction of the MeNB 803 to the SeNB 805.

TABLE 4

| Item | Field | Presence | Description | Notes |
|---|---|---|---|---|
| 1 | Message type | M | | |
| 2 | UE Id | M | Some kind of UE identification | As for any UE specific message |
| 3 | UE As configuration, dynamic part | O | Used to transfer UE context information, | Includes the UL SPS activation status information |

Figure 9:
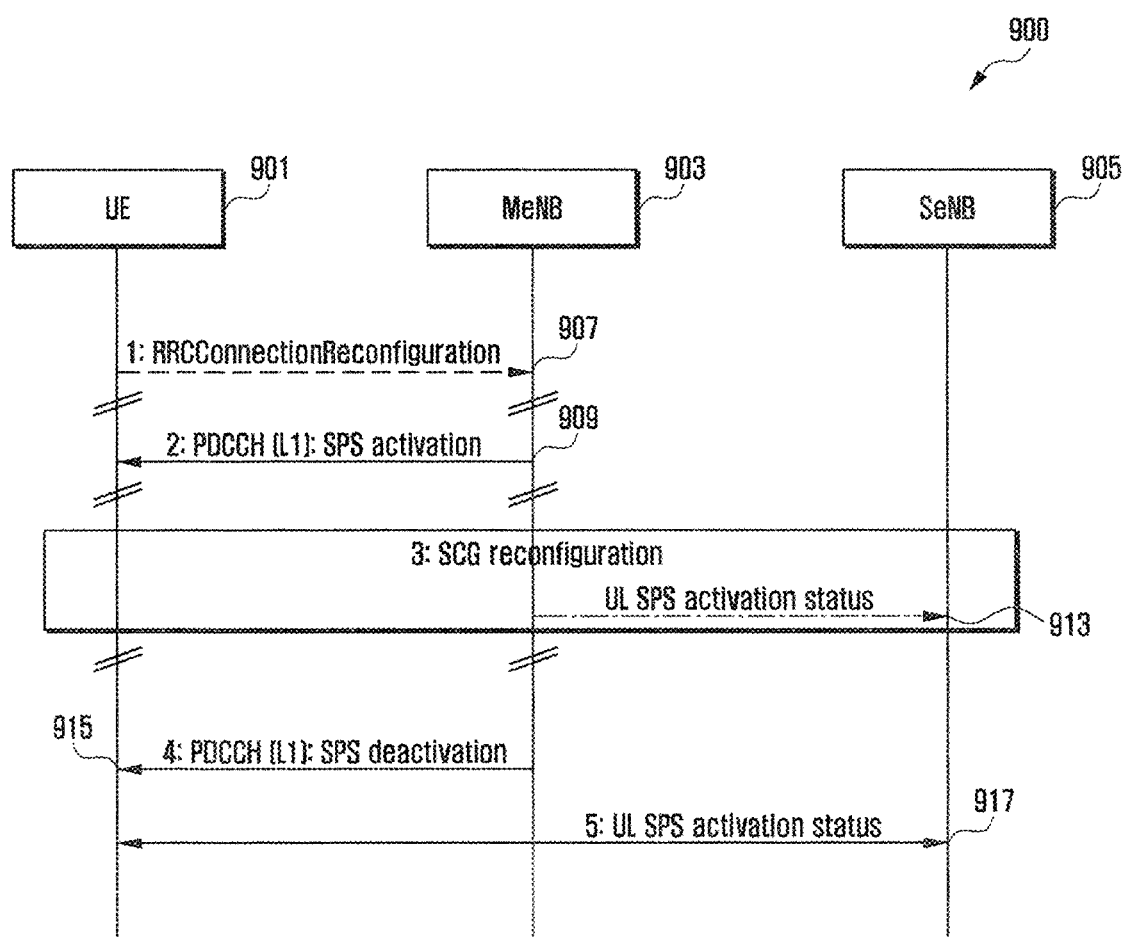
FIG. 9 illustrates an example simplified high level message sequence chart for providing UE status information according to this disclosure.

Referring to FIG. 9, a high level message sequence chart 900 illustrates a case where the UE provides this more dynamic configuration information concerning semi-persistent or periodic UL allocations to the SeNB. The high level message sequence chart 900 illustrates communications between UE 901, MeNB 903 and SeNB 905. In this example, the MeNB 903 and UE 901 employs a RRC re-configuration process, say via RRC ConnectionReconfiguration messages 907, which in this example comprises the MeNB 903 assigning an uplink SPS-Config including a pattern specifying periodically repeating uplink scheduling opportunities assigned to UE 901.

Figure 10:
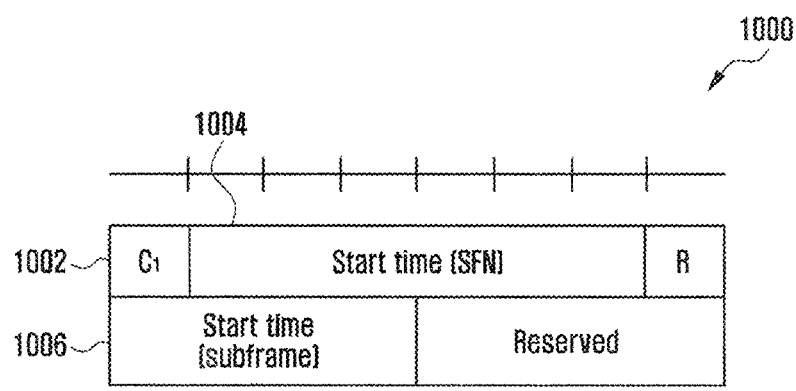
FIG. 10 illustrates an example activation or deactivation MAC control element according to this disclosure.

Subsequently, the MeNB 903 transmits message 909 to the UE 901, in order to activate the uplink SPS configuration, via a physical downlink control channel (PDCCH) (Layer 1) SPS activation message. It should be noted that although only one PDCCH message 909 is illustrated in FIG. 9, it is likely that the MeNB 903 regularly or periodically sends activation or deactivation messages to a number of dual connectivity UEs upon every speech burst illustrated, for example as illustrated with respect to FIG. 8. Subsequent to the E-UTRAN (or MeNB 903) adding or configuring or re-configuring a secondary cell group (SCG) comprising one or more SCells controlled by SeNB 905, the UE 901 provides the uplink SPS activation status information to the SeNB 905 via message 913. At some time thereafter, MeNB 903 will send a further PDCCH (Layer 1) SPS deactivation message to the UE 901 in message 915. In some examples, the UE 901 informs the SeNB 905 about the uplink activation status in message 917 by means of a new medium access control (MAC) control element (CE), as illustrated in FIG. 10.

Further, and advantageously, the UE 901 subsequently signals, via uplink SPS activation status message 917, updated (changed) uplink SPS activation status information to the SeNB 905. In some examples, the operation of the SeNB 905 upon receiving the activation or de-activation indication from the dual connectivity UE 901, is the same as when receiving the information from the MeNB 903.

In this manner, in accordance with some examples and possibly rather than fixing operational parameters such as power headroom of the dual connectivity UE 901 using power headroom reporting (PHR), when the dual connectivity UE 901 is configured to communicate with an SCG, the SeNB 905 is provided with information regarding semi-static periodic UL transmissions of the dual connectivity UE 901 towards the MeNB. In this manner, the SeNB is able to schedule UL resources with UE 901 that do not collide with UL resources being taken by communications between the dual connectivity UE 901 and MeNB 903.

In some examples, the PHR reporting is also intended to affect the scheduling such as to avoid that scenario a UE is allocated a lot of resources whilst it has insufficient power for the concerned uplink transmissions in MCG and SCG. Therefore, in some examples, it is possible to avoid sending PHR changes to effect the same result. In some examples, however, it is envisaged that the concepts herein described also is used in combination with an enhanced PHR reporting scheme.

Referring to FIG. 10, an activation or deactivation MAC control element (CE) 1000 is illustrated in accordance with some example embodiments of this disclosure. In this example, the MAC CE 1000 comprises a single 'C' bit 1002 indicating the activation status of UL SPS activation in the PCell. In some examples, more bits than just the single 'C' bit is introduced to cover future UL SPS that are configured for other master cell groups (MCG), or where there are multiple SCGs. Furthermore, the MAC CE 1000 includes two fields indicating the start time 1004 of the SPS allocations, a first part indicating an SFN offset and a second part indicating the actual sub-frame 1006 within the radio frame indicated by the SFN offset. The SFN offset does not need to employ the full SFN range, as it defines a frame that is relative to timing used for the transfer of the MAC CE 1000. The figure merely shows a possible example of the actual signalling such as that the number of bits are different, while the sub-frame timing is represented by a single field. The figure illustrates also merely one possible example regarding the use of reserved bits.

Figure 11:
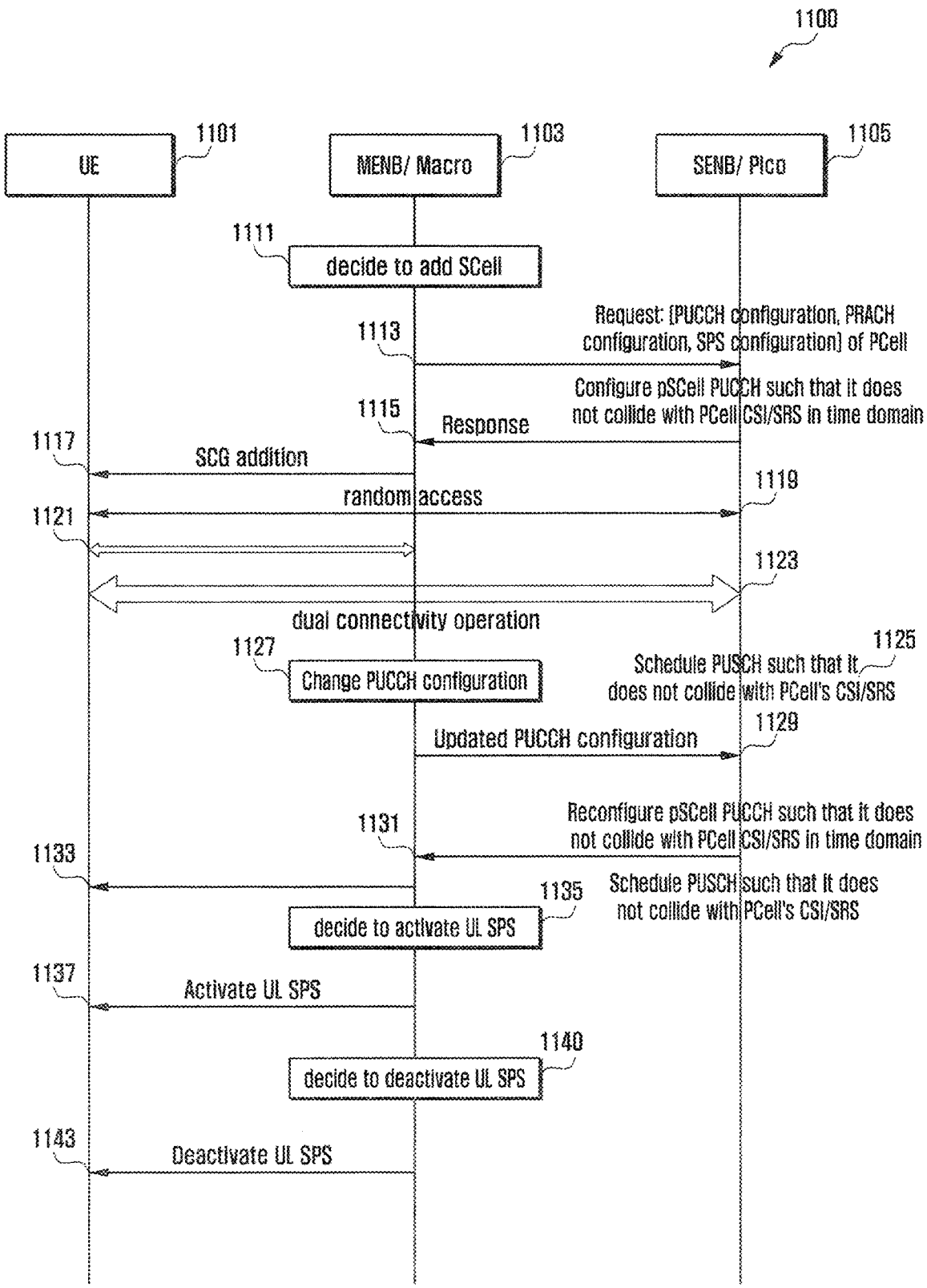
FIG. 11 illustrates an example message sequence chart for a dual connectivity UE operation according to this disclosure.

Referring to FIG. 11, a message sequence chart for control of semi-persistent scheduling is illustrated. As shown, dual connectivity operation is illustrated, comprising UE 1101, macro cell MeNB 1103 and small-cell SeNB 1105. As illustrated, all SPS activation and deactivation messages are controlled by macro cell eNB 1103. Initially, at 1111, the MeNB 1103 decides to add a secondary cell, such as a small cell to an existing secondary cell group, such as a secondary cell group. At 1113, a request is then sent from the MeNB 1103 to the SeNB 1105 to establish a secondary cell group. The request includes the current dedicated radio resource configuration assigned by the MeNB such as covering the configuration related to the master cell group. This dedicated radio resource configuration includes Physical Uplink Control Channel (PUCCH) configuration physical random access channel (PRACH) configuration and SPS configuration of the primary serving cell (PCell). A response is then sent from the SeNB 1105 at 1115 including the configuration related to the secondary cell group, which the MeNB forwards to the UE. This secondary cell group configuration includes, inter alia, the PUCCH configuration of the pSCell. The SeNB uses dedicated resource configuration received from the MeNB when configuring the pSCell PUCCH such that it does not collide with PCell channel state information (CSI) or sounding reference signals (SRS) in the time domain. The MeNB 1103 then informs the UE 1101 that the SeNB 1105 has been added to the secondary (small cell) cell group at 1117. The UE is then able to access the SeNB by sending a Random Access CHannel (RACH) request at 1119. Thereafter, the UE 1101 is able to operate with dual connectivity with both MeNB 1103 at 1121 and SeNB 1105 at 1123.

The SeNB 1105 then schedules Physical Uplink Shared Channel (PUSCH), such that it does not collide with the PCell's CSI or SRS at 1125. The MeNB 1103 then changes the PUCCH configuration at 1127 and inform the SeNB 1105 of the updated PUCCH configuration at 1129. At this point, the SeNB 1105 decides to re-configure the pSCell PUCCH such that it does not collide in the time domain with the PCell CSI or SRS. The re-configured pSCell PUCCH information then is sent to the MeNB 1103 at 1131 and the UE at 1133.

At some later time, the MeNB 1103 decides to activate uplink semi-persistent scheduling (UL SPS) at 1135. The MeNB 1103 then instructs the UE 1101 to activate UL SPS at 1137. According to current state of the art, the SeNB is, however, neither aware of the activation status of SPS nor of the precise starting time of the periodic SPS resource allocations. Hence, it is currently not able to schedule PUSCH transmissions such that they do not collide with any UL SPS transmissions in the Master Cell Group. At some later time, the MeNB 1103 decides to deactivate UL SPS at 1140. The MeNB 1103 then instructs the UE 1101 to deactivate UL SPS at 1143.

Referring to FIG. 12, a modified message sequence chart 1200 for control of semi-persistent scheduling is illustrated. The first section 1209 refers to the first part of FIG. 11 and, therefore, no further explanation of the first section will be given. The second section 1250 refers to a new and advantageous X2 co-ordination and UE reporting phase. Initially, the X2 coordination and UE reporting phase commences with static information being exchanged between UE 1201, MeNB 1203 and SeNB 1205 over an X2 interface.

In accordance with example embodiments, dynamic configuration information, for example SPS activation or deactivation messages is reported by UE 1201 directly to SeNB 1205, via a new medium access control (MAC) layer control element (CE) 1252. In some examples, for example when employing a new MAC CE 1252, the UE 1201 triggers a new MAC CE when a defined uplink transmission with some periodicity, for example voice over internet protocol (VoIP), is utilised. The MAC CE 1252 includes pattern information of the regular uplink transmission, for example the starting point of time.

In some other examples, for example when reusing one or more PHR MAC CEs 1254, the UE 1201 triggers the PHR MAC CE when a defined uplink transmission with some periodicity, for example VoIP, is utilised. In this example, two PHR MAC CEs is transmitted in a MAC PDU. The first PHR comprises PHs for communications with SeNB 1205, and the second PHR comprises PHs for communications with MeNB 1203. Similarly, in some examples, the UE 1201 receives, for example, an SPS deactivation message 1256 from MeNB 1203. In response to this message, the UE 1201 either triggers a new MAC CE 1258 or two PHR MAC CEs in a MAC PDU 1260.

In particular, it is envisaged that the aforementioned inventive concept is applied by a semiconductor manufacturer to any integrated circuit comprising a signal processor configured to perform any of the aforementioned operations. Furthermore, the inventive concept is applied to any circuit that is able to configure, process, encode, or decode signals for wireless distribution. It is further envisaged that, for example, a semiconductor manufacturer employs the inventive concept in a design of a stand-alone device, such as a digital signal processor, or application-specific integrated circuit (ASIC) or any other sub-system element.

It will be appreciated that, for clarity purposes, the above description has described embodiments of this disclosure with reference to different functional units and processors. However, it will be apparent that any suitable distribution of functionality between different functional units or processors, for example with respect to the signal processor 308, 608, is used without detracting from this disclosure. For example, functionality illustrated to be performed by separate processors or controllers is performed by the same processor or controller. Hence, references to specific functional units are only to be seen as references to suitable means for providing the described functionality, rather than indicative of a strict logical or physical structure or organization.

Aspects of this disclosure are implemented in any suitable form including hardware, software, firmware or any combination of these. This disclosure optionally can be implemented, at least partly, as computer software running on one or more data processors or digital signal processors or configurable module components such as FPGA devices. Thus, the elements and components of an embodiment of this disclosure is physically, functionally and logically implemented in any suitable way. Indeed, the functionality is implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature appears to be described in connection with particular embodiments, one skilled in the art would recognize that various features of the described embodiments is combined in accordance with this disclosure. In the claims, the term 'comprising' does not exclude the presence of other elements or steps.

Furthermore, although individually listed, a plurality of means, elements or method steps are implemented by, for example, a single unit or processor. Additionally, although individual features are included in different claims, these are possibly advantageously combined, and the inclusion in different claims does not imply that a combination of features is not feasible or advantageous. Also, the inclusion of a feature in one category of claims does not imply a limitation to this category, but rather indicates that the feature is equally applicable to other claim categories, as appropriate.

Thus, communication units such as wireless access nodes and terminal devices, a communication system and methods relating to implementing dual connectivity for terminal devices such as UEs have been described, wherein the aforementioned disadvantages with prior art arrangements have been substantially alleviated.

Although the present disclosure has been described with an exemplary embodiment, various changes and modifications is suggested to one skilled in the art. It is intended that the present disclosure encompass such changes and modifications as fall within the scope of the appended claims.

What is claimed is:

1. A method performed by a first base station in a wireless communication system, the method comprising:
   determining whether to transmit in device coexistence (IDC) related information and discontinuous reception (DRX) related information associated with a terminal to a second base station associated with a dual connectivity for the terminal;
   transmitting, to the second base station, a first message for configuring at least one cell associated with the second base station, the first message including the IDC related information and the DRX related information associated with the terminal, in case that it is determined to transmit the IDC related information and the DRX related information to the second base station;
   receiving, from the second base station, a second message as a response to the first message; and
   transmitting, to the terminal, a third message associated with the dual connectivity, based on the second message,
   wherein the IDC related information includes a frequency affected by an IDC problem and a direction of IDC interference.

2. The method of claim 1, wherein the determining whether to transmit the IDC related information and the DRX related information comprises:
   receiving, from the terminal, a control message including the IDC related information and the DRX related information; and
   determining, based on the control message, whether to transmit the IDC related information and the DRX related information associated with the terminal to the second base station.

3. The method of claim 1, wherein the third message includes a radio resource control (RRC) reconfiguration message associated with an establishment or a modification for the at least one cell associated with the second base station.

4. The method of claim 1, wherein the first message further includes interest information associated with a multicast and broadcast service for the terminal, and the interest information is to inform that the terminal is interested in the multicast and broadcast service or inform that the terminal is no longer interested in the multicast and broadcast service.

5. The method of claim 1, wherein the first base station is a master base station and the second base station is a secondary base station.

6. The method of claim 5, wherein the first message is transmitted by the master base station to the secondary base station over an interface between the master base station and the secondary base station.

7. A method performed by a second base station in a wireless communication system, the method comprising:
receiving, from a first base station, a first message for configuring at least one cell associated with the second base station, the first message including in device coexistence (IDC) related information and discontinuous reception (DRX) related information associated with a terminal, the second base station is being associated with a dual connectivity for the terminal, in case that it is determined by the first base station that the IDC related information and the DRX related information associated with the terminal is transmitted from the first base station to the second base station;
allocating a resource based on the first message; and
transmitting, to the first base station, a second message as a response to the first message,
wherein the IDC related information includes a frequency affected by an IDC problem and a direction of IDC interference.

8. The method of claim 7, wherein the first message further includes interest information associated with a multicast and broadcast service for the terminal, and the interest information is to inform that the terminal is interested in the multicast and broadcast service or inform that the terminal is no longer interested in the multicast and broadcast service.

9. The method of claim 7, wherein the first base station is a master base station and the second base station is a secondary base station.

10. The method of claim 9, wherein the first message is transmitted by the master base station to the secondary base station over an interface between the master base station and the secondary base station.

11. A first base station in a wireless communication system, the first base station comprising:
a transceiver; and
a controller coupled with the transceiver and configured to:
determine whether to transmit in device coexistence (IDC) related information and discontinuous reception (DRX) related information associated with a terminal to a second base station associated with a dual connectivity for the terminal,
transmit, to the second base station, a first message for configuring at least one cell associated with the second base station, the first message including the IDC related information and the DRX related information associated with the terminal, in case that it is determined to transmit the IDC related information and the DRX related information to the second base station,
receive, from the second base station, a second message as a response to the first message, and
transmitting, to the terminal, a third message associated with the dual connectivity, based on the second message,
wherein the IDC related information includes a frequency affected by an IDC problem and a direction of IDC interference.

12. The first base station of claim 11, wherein the controller is further configured to:
receive, from the terminal, a control message including the IDC related information and the DRX related information, and
determine, based on the control message, whether to transmit the IDC related information and the DRX related information associated with the terminal to the second base station.

13. The first base station of claim 11, wherein the third message includes a radio resource control (RRC) reconfiguration message associated with an establishment or a modification for the at least one cell associated with the second base station.

14. The first base station of claim 11, wherein the first message further includes interest information associated with a multicast and broadcast service for the terminal, and the interest information is to inform that the terminal is interested in the multicast and broadcast service or inform that the terminal is no longer interested in the multicast and broadcast service.

15. The first base station of claim 11, wherein the first base station is a master base station and the second base station is a secondary base station.

16. The first base station of claim 15, wherein the first message is transmitted by the master base station to the secondary base station over an interface between the master base station and the secondary base station.

17. A second base station in a wireless communication system, the second base station comprising:
a transceiver; and
a controller coupled with the transceiver and configured to:
receive, from a first base station, a first message for configuring at least one cell associated with the second base station, the first message including in device coexistence (IDC) related information and discontinuous reception (DRX) related information associated with a terminal, the second base station is being associated with a dual connectivity for the terminal, in case that it is determined by the first base station that the IDC related information and the DRX related information associated with the terminal is transmitted from the first base station to the second base station,
allocate a resource based on the first message, and
transmit, to the first base station, a second message as a response to the first message,
wherein the IDC related information includes a frequency affected by an IDC problem and a direction of IDC interference.

18. The second base station of claim 17, wherein the first message further includes interest information associated with a multicast and broadcast service for the terminal, and the interest information is to inform that the terminal is interested in the multicast and broadcast service or inform that the terminal is no longer interested in the multicast and broadcast service.

19. The second base station of claim 17, wherein the first base station is a master base station and the second base station is a secondary base station.

20. The second base station of claim 19, wherein the first message is transmitted by the master base station to the secondary base station over an interface between the master base station and the secondary base station.

21. A method performed by a terminal in a wireless communication system, the method comprising:
transmitting, to a first base station, a control message including in device coexistence (IDC) related information and discontinuous reception (DRX) related information;
receiving, from the first base station, a first message for a dual connectivity with a second base station;
transmitting, to the first base station, a second message as a response to the first message; and performing a random access procedure with the second base station, based on the first message, wherein the IDC related information includes a frequency affected by an IDC problem and a direction of IDC interference, and wherein the IDC related information and the DRX related information are transmitted from the first base station to the second base station, in case that it is determined by the first base station that the IDC related information and the DRX related information associated with the terminal is transmitted from the first base station to the second base station.

22. The method of claim 21, wherein, the IDC related information and the DRX related information are used to allocate a resource at the second base station.

23. The method of claim 21, wherein the first message is a radio resource control (RRC) reconfiguration message associated with an establishment or a modification for at least one cell associated with the second base station.

24. The method of claim 21, wherein the control message further includes interest information associated with a multicast and broadcast service for the terminal, and the interest information is to inform that the terminal is interested in the multicast and broadcast service or inform that the terminal is no longer interested in the multicast and broadcast service.

25. The method of claim 21, wherein the first base station is a master base station and the second base station is a secondary base station.

26. The method of claim 25, wherein, the IDC related information and the DRX related information are transmitted over an interface between the master base station and the secondary base station.

27. A terminal in a wireless communication system, the terminal comprising:
a transceiver; and
a controller coupled with the transceiver and configured to:
transmit, to a first base station, a control message including in device coexistence (IDC) related information and discontinuous reception (DRX) related information,
receive, from the first base station, a first message for a dual connectivity with a second base station,
transmit, to the first base station, a second message as a response to the first message; and
perform a random access procedure with the second base station, based on the first message, wherein the IDC related information includes a frequency affected by an IDC problem and a direction of IDC interference, and wherein the IDC related information and the DRX related information are transmitted from the first base station to the second base station, in case that it is determined by the first base station that the IDC related information and the DRX related information associated with the terminal is transmitted from the first base station to the second base station.

28. The terminal of claim 27, wherein, the DC related information and the DRX related information are used to allocate a resource at the second base station.

29. The terminal of claim 27, wherein the first message is a radio resource control (RRC) reconfiguration message associated with an establishment or a modification for at least one cell associated with the second base station.

30. The terminal of claim 27, wherein the control message further includes interest information associated with a multicast and broadcast service for the terminal, and the interest information is to inform that the terminal is interested in the multicast and broadcast service or inform that the terminal is no longer interested in the multicast and broadcast service.

31. The terminal of claim 27, wherein the first base station is a master base station and the second base station is a secondary base station.

32. The terminal of claim 31, wherein, the IDC related information and the DRX related information are transmitted by the master base station to the secondary base station over an interface between the master base station and the secondary base station.

* * * * *